Jan. 28, 1958     O. K. KELLEY     2,821,095
TRANSMISSION
Original Filed March 26, 1949     9 Sheets-Sheet 3
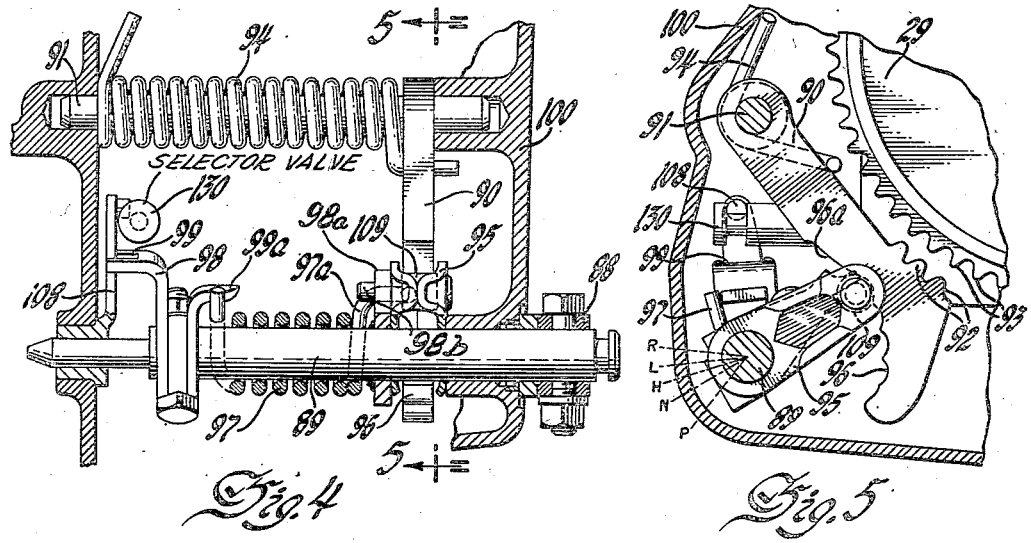
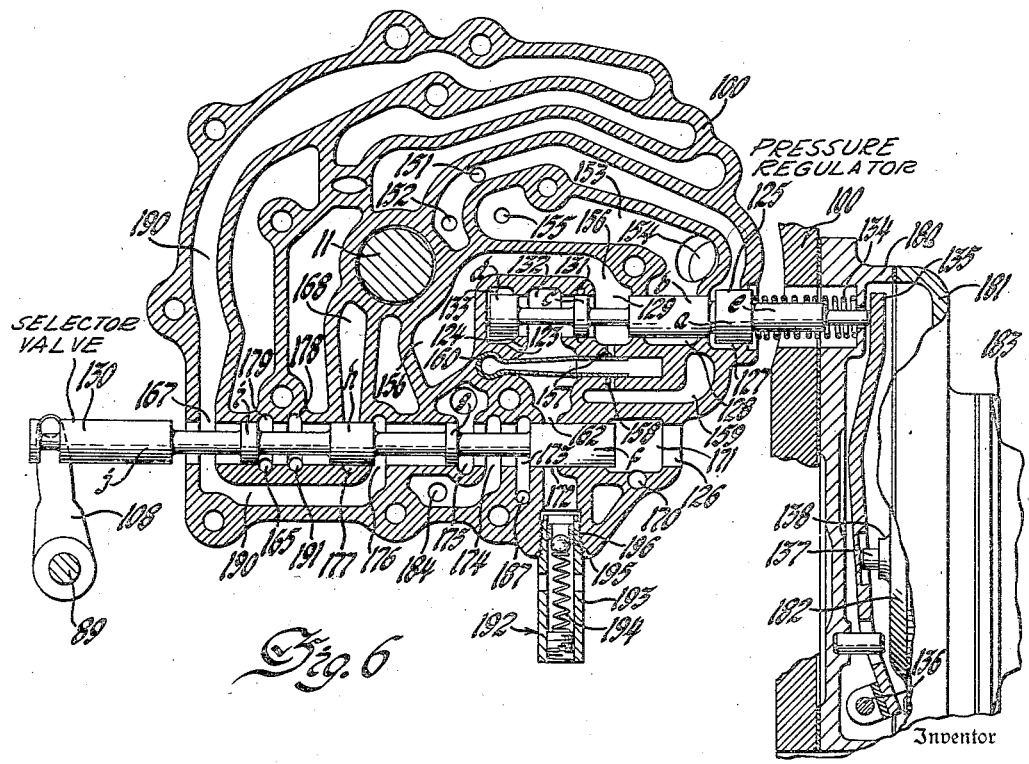
Inventor
Oliver K. Kelley
By
Attorneys

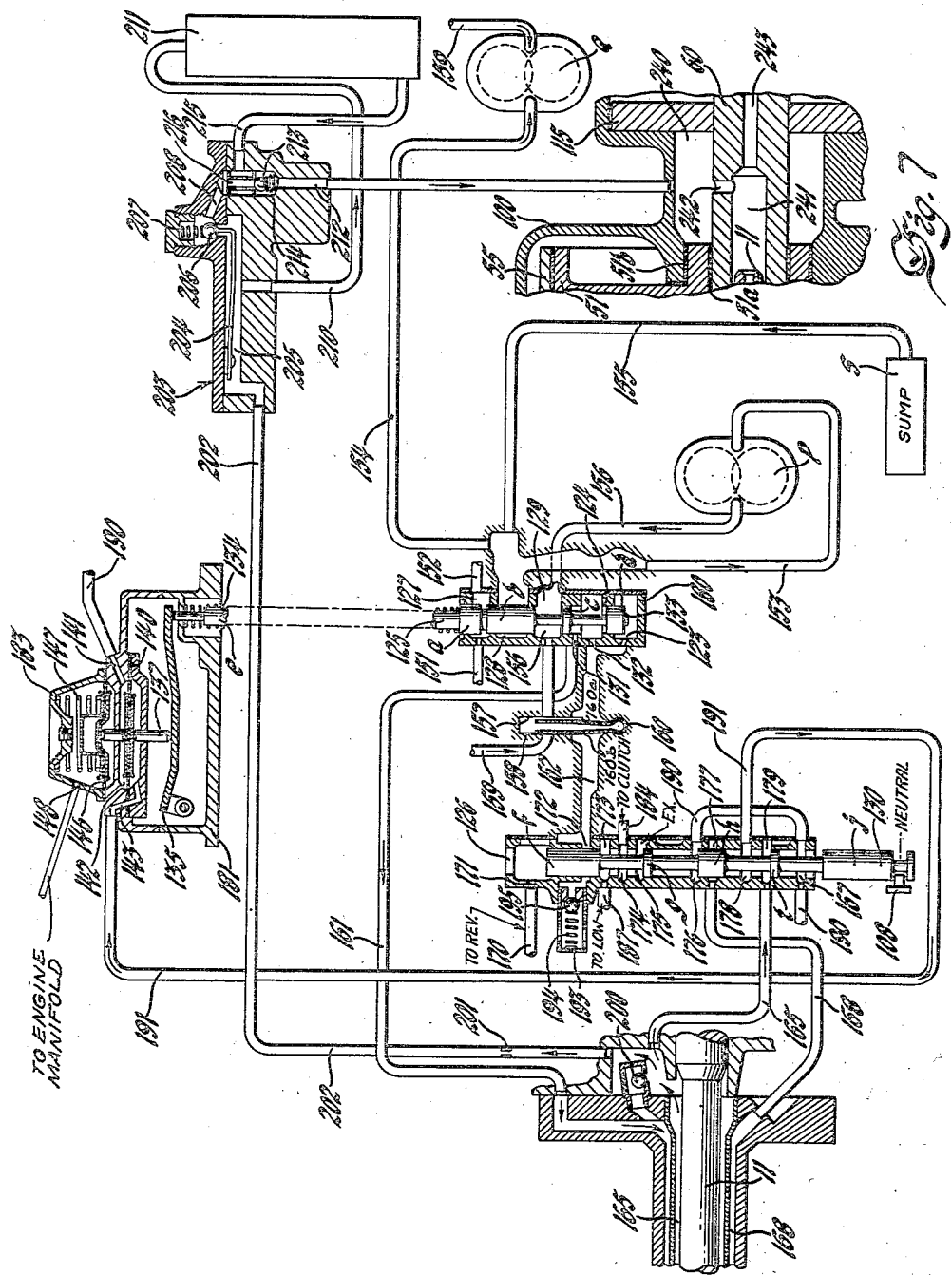

Jan. 28, 1958 O. K. KELLEY 2,821,095
TRANSMISSION
Original Filed March 26, 1949 9 Sheets-Sheet 5
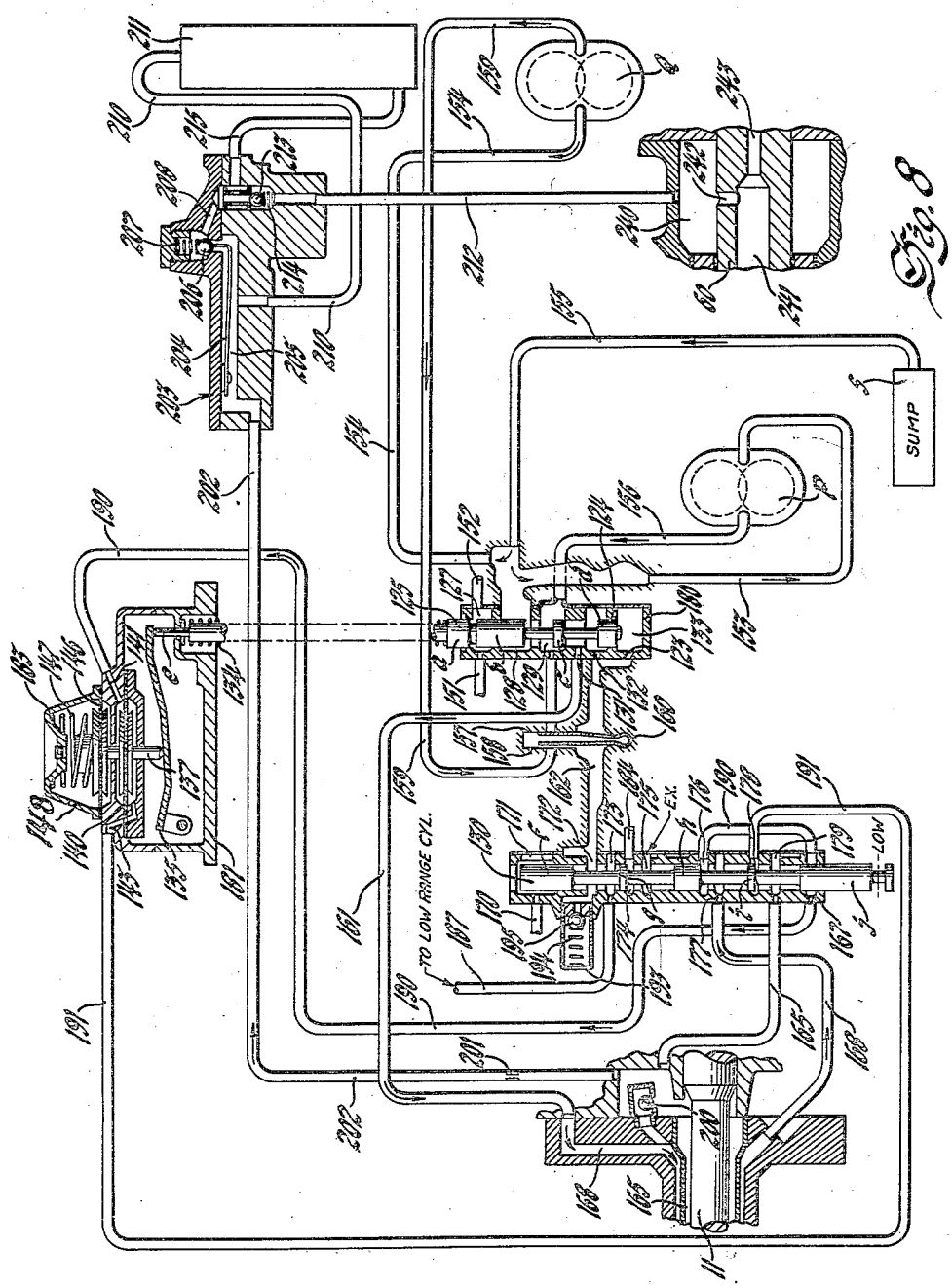
Inventor
Oliver K. Kelley
By
Spencer Willits, Helmig & Baillio
Attorneys

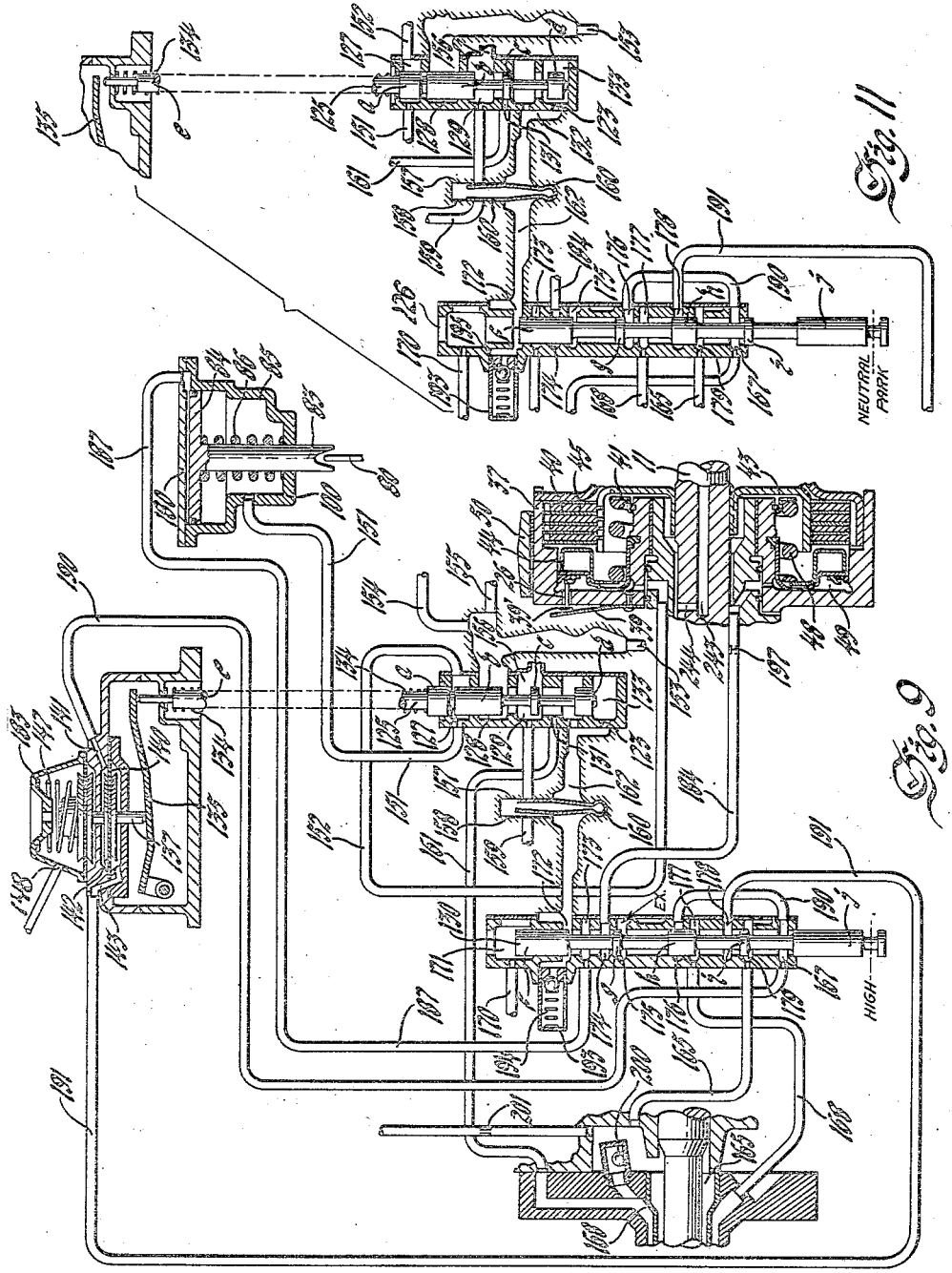

Jan. 28, 1958
O. K. KELLEY
2,821,095
TRANSMISSION
Original Filed March 26, 1949
9 Sheets-Sheet 7
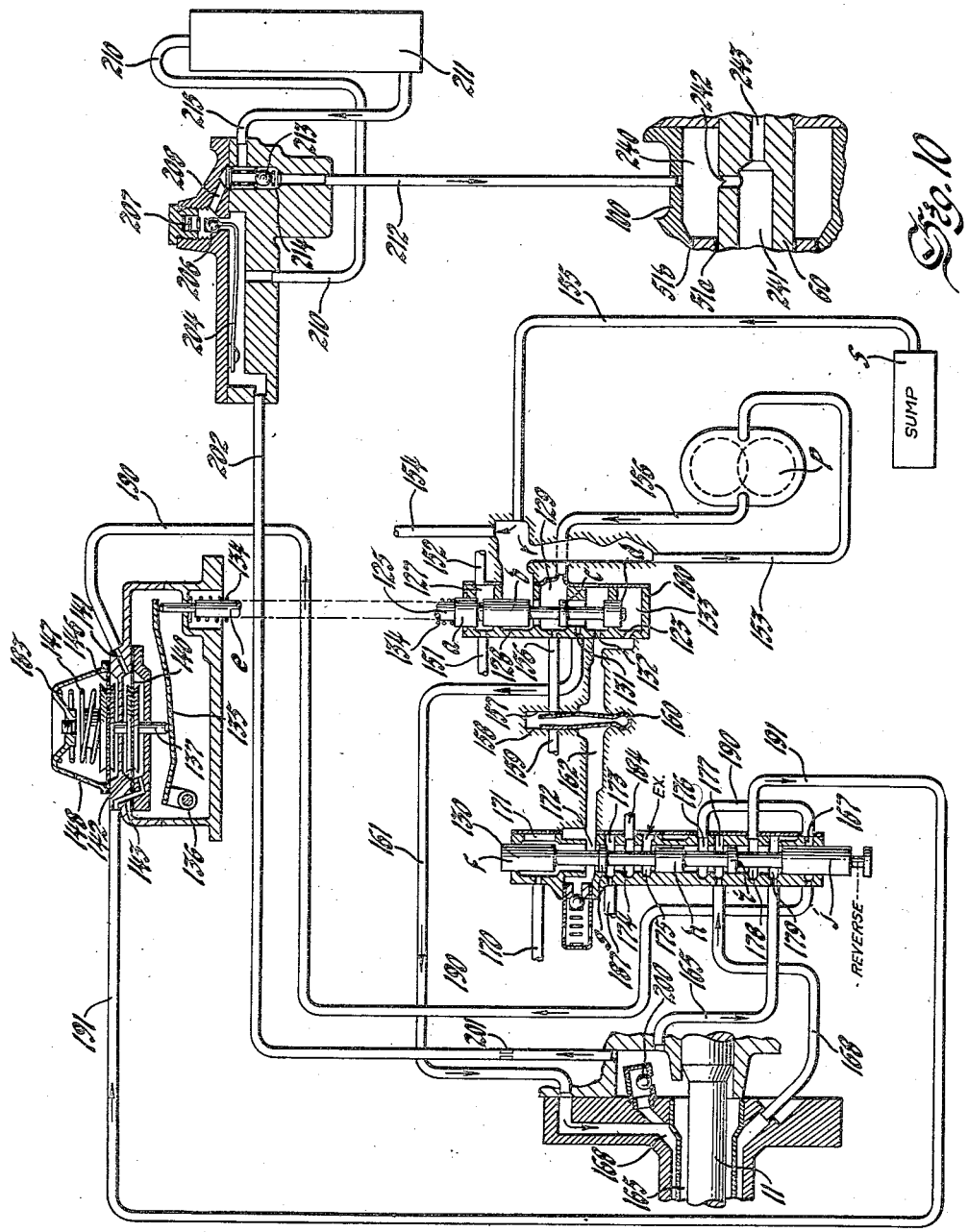
Inventor
Oliver K. Kelley
By
Spencer, Willits, Helmig & Baillio
Attorneys

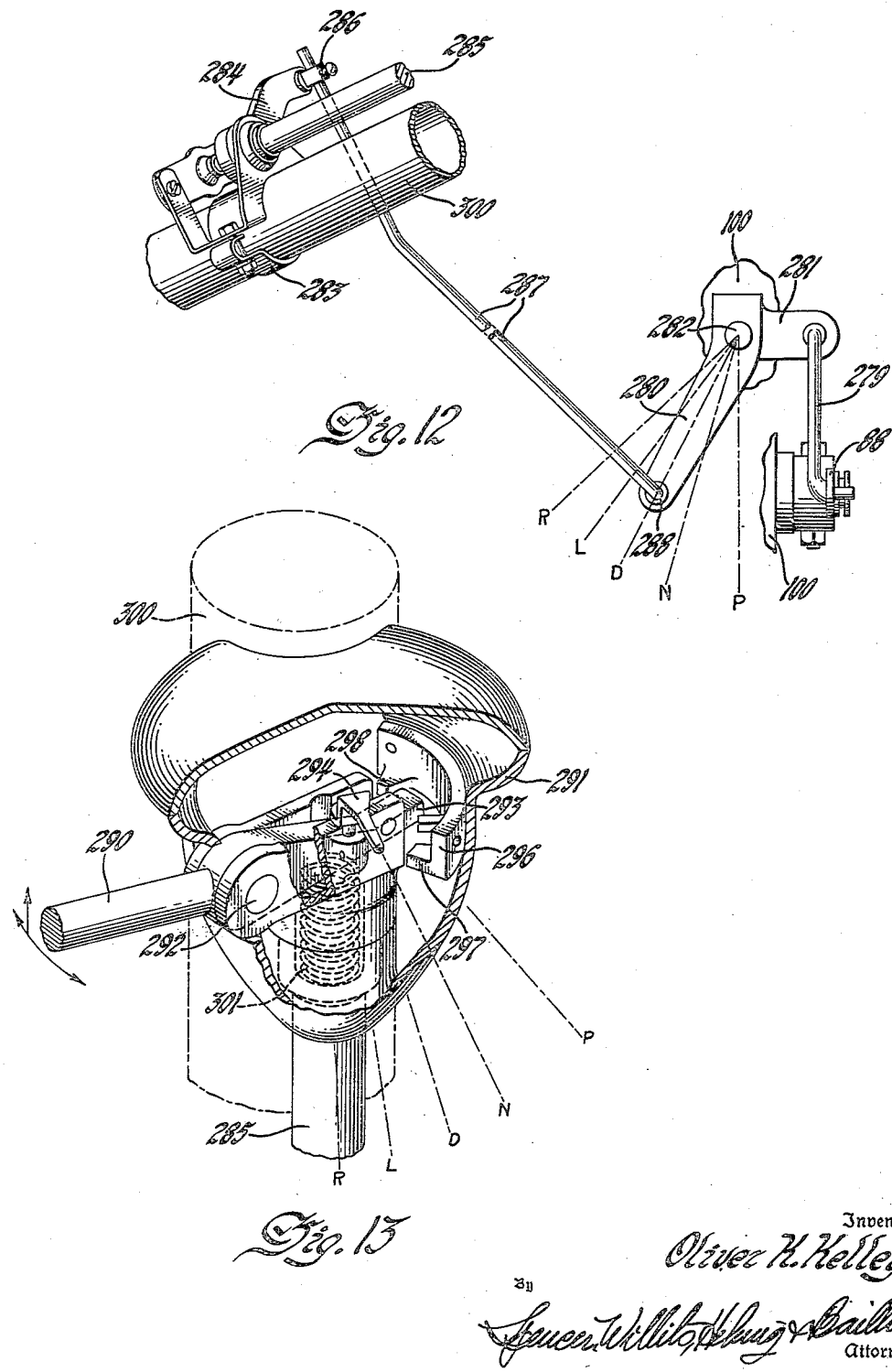

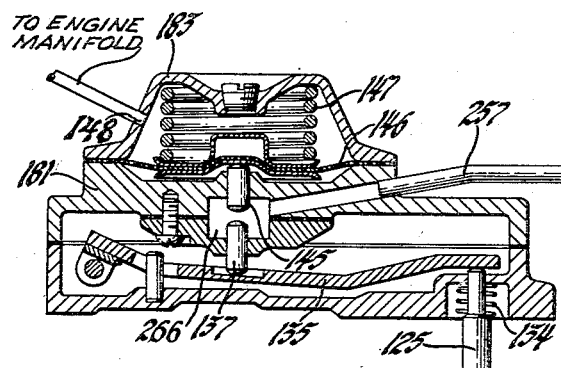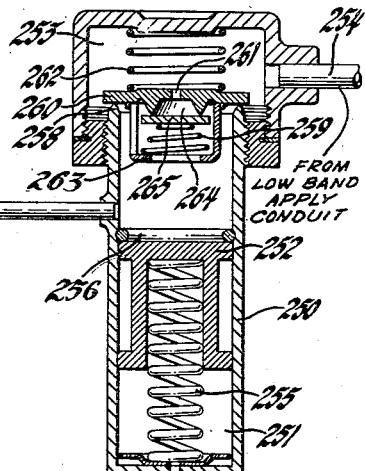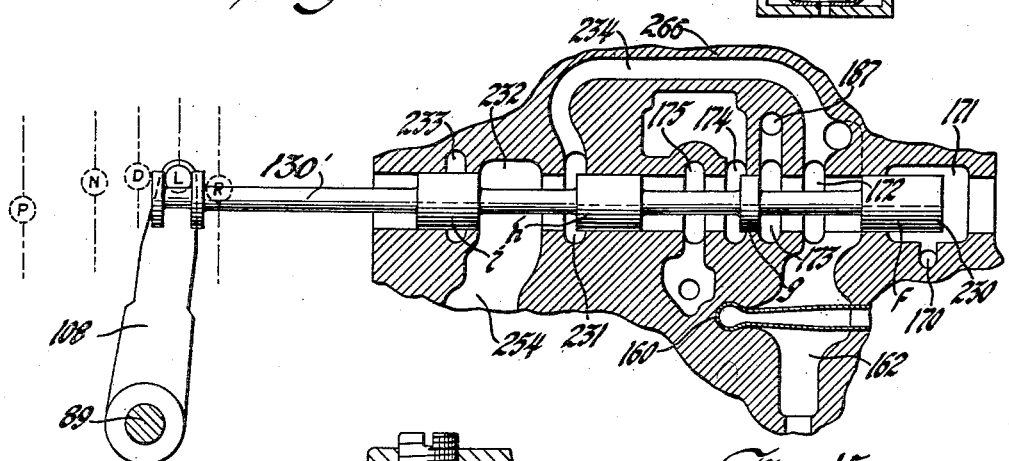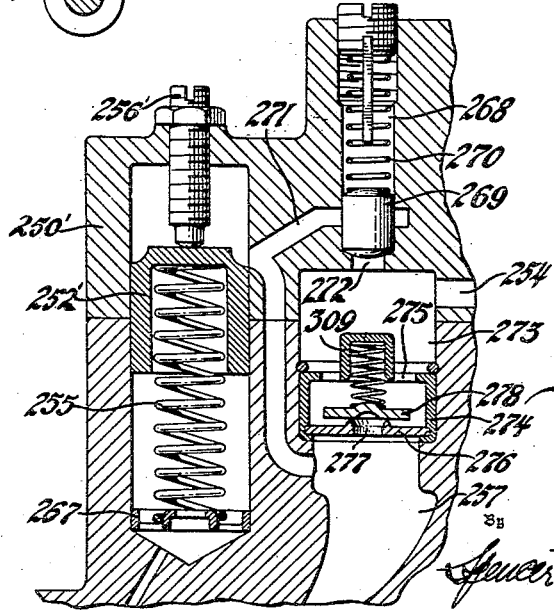

United States Patent Office 2,821,095
Patented Jan. 28, 1958

2,821,095

TRANSMISSION

Oliver K. Kelley, Bloomfield Hills, Mich., assignor to General Motors Corporation, Detroit, Mich., a corporation of Delaware Continuation of application Serial No. 83,618, March 26, 1949. This application October 19, 1955, Serial No. 541,653

38 Claims. (Cl. 74—645)

This application is a continuation of my application, Serial Number 83,618, filed March 26, 1949, now abandoned.

The present invention relates to a combination of fluid torque converter and gear drive mechanism which provides plural ranges of torque conversion through a hydraulic torque converter, and provides for uninterrupted changing between ranges of the driving torque of the combined drive mechanism, by fluid pressure actuator means, operative upon ratio-determining brake and clutch elements.

It relates to arrangements of fluid turbine torque converters with gearing, wherein the fluid torque converters are of a type which has an effective operation cycle ranging from maximum torque multiplication to substantial one-to-one drive; and to the combination of such torque converters with change speed gearing arranged to be changed under torque by the fluid pressure actuation and control means.

It pertains further to special fluid pressure regulating devices which coordinate pressure controlling forces with ratio selection controls for such drive assemblies, which devices not only provide variable pressure timing of the shift intervals; but also provide regulating means for the driving torque in plural ratios, which regulating means respond to variable pressure regulation during inter-ratio transitions.

The invention further pertains to the utilization of plural pump fluid pressure supply means variably controlled for providing the torque-sustaining forces for the gear change mechanism, in which the supply pressure becomes automatically and variably effective for all of the required drive and control operations of the assembly under all drive conditions.

The invention pertains to drive controls for such drive assemblies in which there is a single ratio control for the operator, capable of establishing any desired drive ratio by simple motion from one station or position to another, all other controls being wholly automatic with respect to the ratio actuating and holding pressures.

A primary object of the invention is to provide a fluid torque converter with a combined gear train having a full range of uninterrupted torque output under all driving ratios, and including full torque and maximum performance operation in the ranges determined by the change of ratios of the gear assembly for all of the driving ranges above an initial predetermined speed and torque. A further object of the invention is to provide a gear train serially driven by the torque converter having fluid pressure actuated ratio changing mechanism effective for direct forward drive, low ratio range drive and for reverse drive; in which the fluid pressure actuation mechanisms are supplied by constantly regulated line pressure, automatically maintained, variably applied and controlled by a single manual valve.

An additional object is to provide a fluid pressure supply system for the aforesaid constructions which maintains a positive pressure in the working space of the torque converter, maintains through the same, a steady flow of fluid which is traversed through a cooler device and which utilizes the differential pressures of that space to operate modulator mechanism controlling the said regulated pressure.

It is an object of the invention to utilize pressure control valving which automatically maintains the flow of fluid to the torque converter working space, while simultaneously maintaining a controlled variable line pressure for the operation of the fluid pressure ratio actuating system. In this connection it is a further object to control the magnitude of the ratio actuation and holding pressure by a change of selected speed ratio, such that the pressure performing a fluid pressure actuation operation is varied in proportion to the degree of torque multiplication required.

Another object is the provision of special valve means and mechanism which shall be responsive to the variations in the power and load conditions during upshift and downshift ratio changes, and which introduce a dynamometric characteristic for providing smooth torque shifts under all change of drive operations.

An additional object is to provide a selective oil flow control, thermally operated, capable of producing an accelerated cooler flow of fluid from the torque converter during increased torque intervals, correlated with delivery of cooled oil to lubrication passages.

Another object is to provide an overcontrol upon the regulated line pressure mechanism and modulator devices which shall respond to sudden demands for accentuated engine-braking and full torque operation.

In generally known constructions in which fluid drive is obtained by bladed turbine devices known as torque converters, it has not been known to place such converters between the source of driving power and a speed change gearing unit which afforded full torque shift under all drive conditions. In the case of gear units shown in prior art arranged in series with a primary drive torque converter, it has been generally necessary to unload the drive in some manner for the change of drive ratio, this process resulting in dwell interval losses, as well as jerky transitions tending to shock the drive mechanism and cause discomfort to the driver and passengers. The present invention avoids these difficulties by utilizing a special form of torque converter which is capable of delivering full torque acceleration from maximum reduction to substantial 1-to-1 drive without interruption, and second, by utilizing a special form of a regulated gear ratio shift actuator system which variably controls the transfer of torque from one drive ratio to the other by devices which measure not only the degree of existing torque and power flow, but also which establish a predetermined amount of torque overlap during the shift intervals. The result of this combination is a drive assembly having units which inherently provide full ranges of torque multiplication with full capability of change between said ranges without surges of unbalanced torque which could appear as shock accelerations or decelerations. As described below, the combinations stated above permit the car driver to accelerate from standstill to full speed in either of two forward drive gear ranges, or to initiate acceleration in one range and shift to the other during the acceleration interval or at any other time. In practice, with present high-compression motor car engines, this combination enables the car driver to obtain maximum performance whenever needed, without the necessity of performing any extra manual operation other than movement of a ratio control handle from one station or position to another. For ordinary driving use this stated ratio range shift of the control handle has been found unnecessary, and the lower range of speed ratio afforded, is required to be used only for emergency low range drive purposes, making available the ultimate acceleration performance of the drive equipped with this invention, at all times. The control handle also serves as a parking brake controller, while unloading the pressure system.

The gear train used in the combination herein is believed to possess elements of novelty although the general form is thought to be old. The gear train is equipped with a driving sun gear and a reaction sun gear which are clutch-coupled for 1-to-1 drive of the output connected carrier. The driving sun gear meshes with a long planet gear which is meshed with a short planet gear, the latter meshing with the reaction sun gear. An annulus gear meshing with the short planet is braked for establishing reverse gear drive, while the reaction sun gear is braked for low forward drive. This train is supported against rocking couples by close fitting of the members at inward radial points, with proper bearings. The compact gear arrangement enables the clutch mechanism to be compartmented adjacent the gearing and supported by web extensions of the casing through which the controlling fluid pressure is fed directly from an adjacent valve assembly. As will be understood further the gear and clutch assembly is compartmented separately from the fluid torque converter, with supply pump passages connected through a casing web section between the converter and gear unit compartments. The supply sump is separately compartmented. The construction shown permits unusual rigidity and exact alignment, while affording space for converter fluid passages and the controls. A second extension of the casing assembly at the rear of the gear unit houses a pump which may supply the fluid pressure system under all driving conditions except for primary drive.

The extensions of the casing between the converter and gear unit compartments provides reaction support for one-way devices which prevent backward rotation of a plurality of stators of the torque converter, and which connect plural impellers of the converter.

The torque converter assembly shown has some novel features. It consists of five bladed elements located so that the impeller is in the outflow zone of the working space, the driven turbine rotor is in the inflow zone, the two rotatable reaction rotors are in the inner radial zone bridging inflow with outflow, and the fifth bladed element is an auxiliary impeller located in the radially inward portion of the outflow zone adjacent the second of the two reaction rotors. The reaction rotors are prevented from backward rotation by one-way brake devices, and an auxiliary impeller is connected by a one-way clutch to the main impeller so that under high torque and high toroidal flow velocity in the converter working space, the auxiliary impeller may respond to the velocity effect and run forwardly faster than the main impeller. This converter provides uninterrupted drive from initial maximum torque multiplication to approximate 1-to-1 ratio between converter input and output, which in combination with the change gear unit equipped with full-torque shift actuation and variable torque capacity control facilities, gives a wholly new drive acceleration from standstill to 1-to-1 drive, in which the range of ratio may be changed at any time, both ranges providing full performance output where demanded by the operator. There are no dwells whatever in this shift arrangement.

There are herein, in the described invention, special control features particularly adapted to the drive mechanism disclosed, these controls driving from variable pressures regulated by the drive conditions to set up accurately determined actuating and holding pressures for the ratio-establishing members of the transmission, and these controls are also made operative for scalar pressure values by the operator settings of the ratio selector mechanism, which mechanism may be readily moved among the drive positions, while the variable pressure controls automatically operate to provide sufficient torque capacity for all the needs of the drive mechanism, and without shock, and permit one to obtain special engine-braking action for emergency operation.

Further advantages, novelties and new and useful results appear in the following description and attached drawings which represent one example of the invention herewith, in which:

Figure 1 is a vertical elevation in section of a vehicle drive assembly embodying the invention showing a fluid torque converter, gear train, oil pumping and lubrication system and an arrangement of compartmenting for the separate units.

Figure 2 is a part section taken at 2—2 of Fig. 1 to show the reverse drive actuator mechanism; and Figure 3 is a similar section at 3—3 of Figure 1 to show the low range drive actuator mechanism, and portions of a pressure modulation device which operates automatically for providing variable regulated pressures for actuating the different ratios of drive afforded by the converter and gear units of Figure 1.

Figures 4 and 5 are sectional views of the parts of a manual control linkage connecting valve operating and parking brake mechanism with the primary manual controls.

Figure 6 is a sectional view of a valve arrangement, one of the valves of which is shown in cooperation with the modulator device of Figure 3, the other valve being operated by the linkage of Figures 4 and 5.

Figures 7 to 11 are composite diagrams embodying control parts, units and elements of the foregoing Figures 1 to 6, Figure 7 showing the operating conditions for neutral; Figure 8 for low range; Figure 9 for direct; Figure 10 for reverse, and Figure 11 for parking.

Figure 12 is a view of the external control parts connected to and operating the construction of Figures 4 and 5 as adjoining the lower portion of the steering column of a vehicle, and Figure 13 is a view in part section of the external hand controls located at the upper end of the steering column cooperating with the structure of Figure 12.

Figure 14 is a part-sectional view of a pressure modulator device which may be used as a replacement for the modulator mechanism of the showing of Figures 3 to 11, representing some economies in numbers of parts, simplicity of connections, and a different approach to solving the problem of obtaining extra torque capacity in emergency ratio drive. Figure 15 is a modified control valve for the Figure 14 structure, shown with a part-section of a valve body, and Figure 16 is a modification of an accummulator valve arrangement to that shown at the right of Figure 14.

Figure 1:
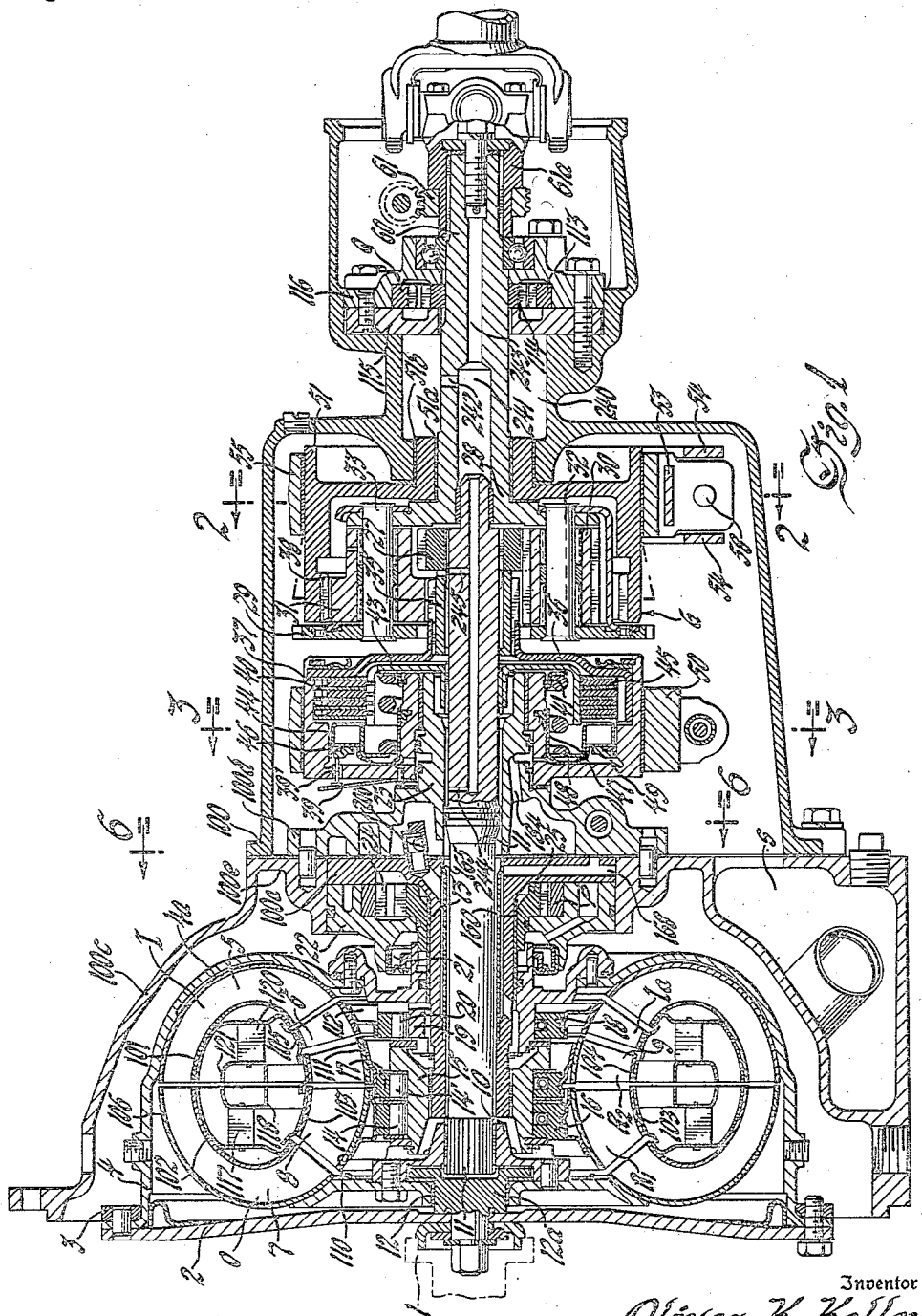

Figure 1 is a vertical section taken through the transmission assembly of the invention, to show the relative positions of the parts and units. The vehicle engine is located at the left, and constantly drives the unit next adjacent, which is a fluid torque converter, arranged to drive the assembly output shaft 60 through a two-speed and reverse planetary gear unit.

The forward portion of the assembly is contained within the housing 100c, and the rear portion within the second housing 100 continuous with the first, the converter compartment section being denoted by 100c, the gear section by 100.

The engine crankshaft 1 has a flange bolted to a plate 2 which is attached at section 3, to a drum 4 acting as a container for the converter unit. The drum 4 is attached to the shell or backing member 4a for the blades 5 of impeller I of the converter, which deliver circulating liquid to the blades 7 of the output rotor O. A separate impeller rotor Ia having its blades 6 located inward radially from the blades 5 has its hub 112 attached to a member 18 of a one-way clutch, and the member 18 with inner race 19 attached to drum 4, provided a work space for one-way clutch members 20. Blades 6 are held in core section 105. The member 18 has the customary cam slots set at an angle with respect to the direction of rotation so that the auxiliary impeller Ia may rotate forwardly faster than the primary impeller I, but not slower than the latter.

The bladed working space of the converter is completed by two reaction rotors bladed at 8 and 9, the first of which receives fluid from the rotor O, delivering same to reaction wheel blades 9, which latter in turn deliver the fluid to the auxiliary impeller Ia having blades 6. A web 100e of the housing 100c is assembled with a radial flange portion 100a bolted and keyed between sections 100c and 100d, and a cylindrical sleeve 13 splined to the collar of web 100e and to inner race member 15. The outer cam member 16 is attached to reaction rotor $R_1$, and the outer cam member 17 is attached to the reaction rotor $R_2$. One-way locking members 14 and 14' are located between the members 15 and 16, and the one-way locking members 14' are placed at the right of face member 15, to engage the outer member 17. These latter reaction-locking one-way devices by reason of conection with the inner member 15 and the non-rotating splined sleeve 13 of the part 100e, are arranged to prevent backward but permit free forward rotation of the reaction rotors $R_1$ and $R_2$.

The output rotor I is mounted on a hub 10 which is splined to the centrally located shaft 11, which is supported in a piece 12a fixed to the section 2 and supporting the pilot bearings 12. The shaft 11 extends to the right where it is splined for sun gear 27, and clutch hub 43.

The torque converter shown here is of a type disclosed in my application for Letters Patent, Serial No. 790,950, for "Multiple Stage Torque Converter Drive," filed December 11, 1947, but differs therefrom in certain important respects, the differences residing in the special blade and rotor arrangement within the covering space and in the relative operating ranges of circumferential fluid velocity and toroidal velocity, with respect to the positive drive under overtaking torque and in other particulars.

For convenience the main impeller having blades 5 is denoted by I; the output turbine having blades 7 by O; the first reaction wheel with blades 8 by $R_1$, the second reaction wheel bladed at 9 by $R_2$, and the auxiliary impeller supporting blades 6, by Ia.

The shell 106 and core section 102 support blades 7 of rotor O on hub 10. The hub 110 and core section 103 support blades 8 of rotor $R_1$. The hub 111 and core section 104 support blades 9 of rotor $R_2$. Blades 5 of impeller I are supported in core section 101 and drum 4. The torque converter main fluid working space lies outside elements 101 to 105 and inside elements 4, 106, 110, 111 and 112, the fluid body of which has both toroidal gyration and rotation about the main axis.

The auxiliary impeller Ia has blades 6 supported in hub portion 112 and core section 105.

In addition, a second fluid working space is enclosed within the core ring sections 101 to 105, there being reverse torque impeller blades 117 attached to the core ring section 102 reinforced by inner core ring piece 118, and reverse torque rotor blades 120 attached to the core ring section 101, reinforced by inner core ring piece 121. There is a free, unbladed torus channel between the inner core ring pieces 118 and 121. Under overtaking torque, the blades 117 located at a slightly greater radial distance than blades 120 deliver fluid at an accelerated velocity to blades 120, so that a degree of engine braking is obtained which increases the driver safety factor as against the coasting or freewheel effect experienced with other forms of fluid torque converters. The blades 117 and 120 are both of curved section, and under normal torque converter drive, their convex back portions are rotating relatively so that whatever fluid impingement exists within the inner core ring working space, is highly inefficient, with only a small fraction of torque being transmitted on a fluid flywheel basis. Under overtaking torque, the blades 117 act as impellers and deliver fluid from their concave pockets to the opposing concave pockets of blades 120 at sufficient kinetic value to provide a fluid flywheel torque of reasonable efficiency, capable of starting a stalled engine, for example, and always available for providing a more solid feel to the drive, with less need for use of the vehicle brakes. It is thought novel to incorporate reverse power flow fluid flywheel blading inside a fluid torque converter working space, for obtaining this useful result.

The pumps P and Q of Figure 1 are provided to maintain both the working space of the converter filled at all times during its whole operating cycle, and for supplying servo pressures required to actuate the speed ratio-determining elements of the gear unit, to be described further.

The front pump P is supported by the radial portion of the part 100e, against which is fitted the pump body 22 and plate 100a properly formed to accommodate the driven pump gear 24 and the driving pump gear 25 fixed to an axial extension of race piece 19 bolted to the drum 4. The ported plate 100a is located at the right of the joining of the housing sections 100 and 100c, being formed into an axial sleeve 23 which surrounds a portion of the shaft 11. The pump passages and conduits of the system will be described further in detail. The seal 21 is located between an inward radial extending portion of the pump body 22 and the axially extending portion of the hub of drum 4.

The rear pump Q is assembled in the rear portion of casing section 100, the pump assembly including two attached portions 115 and 116, the portion 115 being a ported plate forming an endwall, the portion 116 being recessed and providing bearing for the driven gear 113, the meshing driving gear 114 being keyed to shaft 60. The plate 116 completes the assembly, and is bolted to an endwall of casing section 100. The pump connections are shown in Figures 7 to 11.

As shown in Figures 7 to 11, the arrows leading from the delivery of pump P indicate the flow of oil from pump P to the converter working spaces. The converter fill or supply passage 168 leads between members 13 and 22 radially inward of the seal 21 and the adjacent axial flange of drum 4. The oil flows radially outward between the hub 112 of rotor Ia and the hub of drum 4, and enters the working space between the blades 6 of the auxiliary impeller Ia and the blades 5 of the impeller I. Here the oil is accelerated into the circulatory flow, and while a portion of the oil body may escape at the outer radial parting zone to flow into the space radially outward of, and to the left of turbine output member O, restrained between flange plate 3, drum 4, and the back of rotor shell 106, the main portion escapes between blades 7 and 8.

Oil may flow out from the working space circulating stream, radially inward of the space between reaction rotor R–1 and turbine member O, and along the space external of shaft 11 inside the axial portion of non-rotating casing element 100e and sleeve 13 and from thence by delivery passage 165 for connection to the flow control system of Figures 7 to 11.

Centrally placed gear unit G is made up of carrier 28, having a flange integral with shaft 60 and having a double set of meshing planets 30 and 31 supported on separate spindles 32 and 33 respectively, carrier 28 having toothed web 29 at the left. The planets 30 extend to full width between the radial portions of the carrier 28 and mesh internally with the sun gear 27, and externally with the planets 31 as indicated in Figure 1. The second sun gear 35 is meshed with the planets 31 and is attached to a radial web 36 of drum 37, splined internally to accommodate clutch plates 40. The left portion of the drum 37 at its inward portion extends axially to the right, and is fitted with the keyed flange 41 acting as a retainer for spring 48. The internal clutch plate hub 43 is splined to shaft 11, and is externally splined to accommodate plates 45, which mate with clutch plates 40. A clutch presser piston 44 is mounted to slide inside the drum 37 within the seal members 46 and 47, and is normally held to the left by the clutch release spring 48, which bears against the flange 41. As will be understood further fluid pressure is admitted by passage 184 at the left to cylinder 49 between the radial wall of the drum 37 and presser or piston member 44 to compress the stack of clutch plates 40—45 for obtaining a locking couple between the sun gears 27 and 35, which establishes direct drive between shafts 11 and 60, thru the gearing. A further clutch cylinder construction is shown in Fig. 9, in detail.

The drum 37 is surrounded by a brake member 50 so that it may be held against rotation and cause the sun gear 35 to stand still; requiring the planet pinions 31 to roll around the sun gear 35. As will be understood, when band brake 50 is actuated, the shaft 11 drives the shaft 60 at low gear ratio.

Surrounding the planet gears 31 is a meshing annulus gear 38 attached to drum 51 supported on bearings 51a on a cylindrical portion of carrier 38. The annulus gear 38 and drum 51 are surrounded by a band brake 55 which is actuable for stopping the drum and annulus 38 to establish reverse gear drive between the shafts 11 and 60.

The rear portion of the gear casing 100 supports the shaft 60 by bearing 51b. The shaft 60 is splined for small speedometer gear 61 and for universal joint coupling sleeve 61a.

As described to this point, the engine drives the torque converter assembly, which in turn drives the gear unit G, which determines one of three driving conditions for shaft 60; namely, low range, high range, or reverse gear drive.

Figure 2:
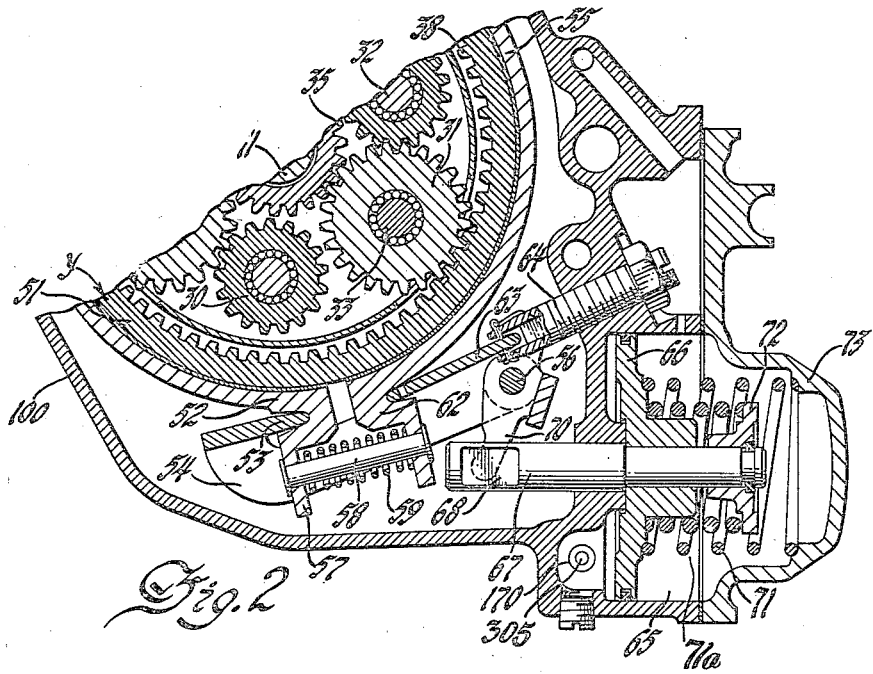

In Figure 2 the casing 100 is broken away and the part-sections of reverse band 55 and drum 51 of annulus gear 38 of Figure 1 are shown.

The band apply end 52 is notched to receive wedge-shaped apply tang 53 of apply link 54 supporting pivot 56, and has the projecting ear 57 apertured for alignment bolt 58 and forming a seat for the adjacent end of releasing spring 59.

The band anchor end 62 is similarly notched to receive anchor strut piece 63 pivoted in a notch of the adjustable anchor 64, and is pierced to accommodate bolt 58, and formed to receive seating spring 59.

The casing 100 is recessed to form a cylinder 65 for piston 66 and apertured to guide the piston rod 67 slotted at 68 to register with arm 70 pivoted on shaft 56. The upper end of the arm 70 is formed to engage strut 63 and pinch the band 55 on the drum 51 when the piston 66 is urged by pressure fed to passage 170 to compress piston return spring 71, and rock lever 70 counterclockwise.

Pressure in cylinder 65 loads band 55 and release of the pressure permits spring 59 to release the band 55. The external casing section 73 forms the head for the cylinder 65. The piston 66 has limited sliding motion on rod 67 compressing the spring 71a until the end stop 72 is encountered. This applies force gradually to the band 55 during the loading interval.

Figure 3:
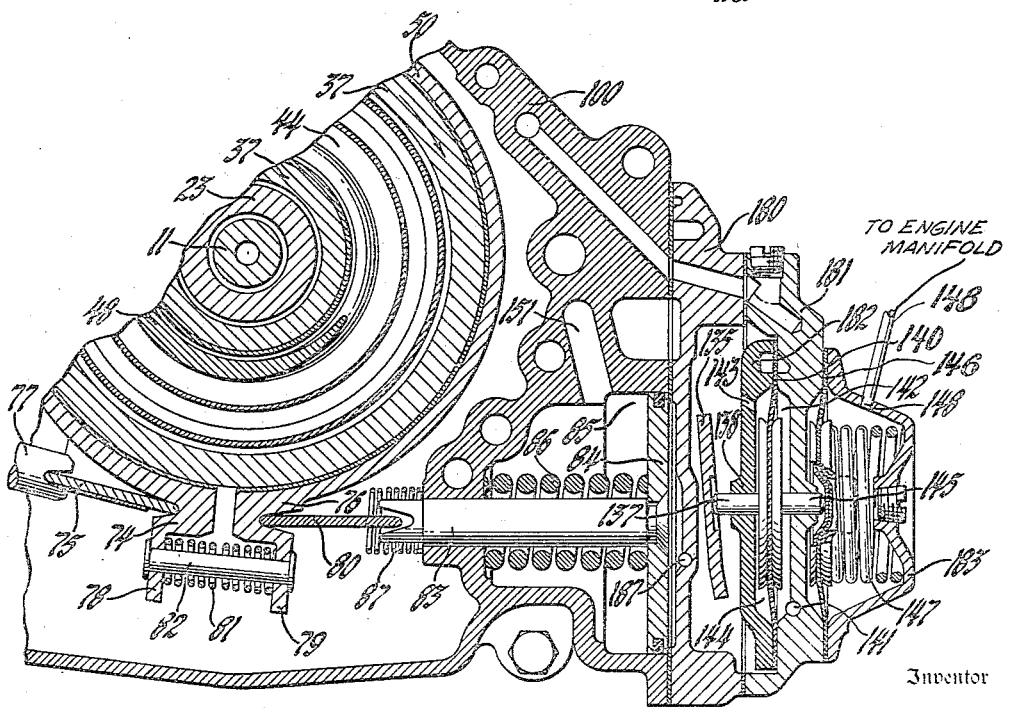

Figure 3 shows the casing 100 broken away and the part-sections of low gear band 50 and drum 37 of sun gear 35 of Fig. 1. The band 50 terminates in end portions 74 and 76, the end 74 being notched to receive anchor strut 75 supported by the adjustable anchor 77 secured in the casing, and having ear 78 similarly used as that of the Figure 2 construction. The band end 76 is notched for apply strut 80 which fits into the notch of rod 83 of piston 84 in the servo cylinder 85 formed in the casing. The spring 81 spreads the band ends 78 and 79 for brake release whenever the piston, under the influence of piston return spring 86, is fully to the right as Fig. 3 is viewed. The small spring 87 is threaded into the strut 80 to hold the strut on the piston rod and establish a given piston travel before the end 76 of the band 50 is moved for brake actuation. The casing portion 180 forms the head for cylinder 85. The passage 187 delivers brake apply oil to the cylinder 85 on the right of piston 84 and the passage 151 delivers brake release oil to the left of the piston as Fig. 3 is viewed.

The arm 135 bears on the regulator valve stem 125 (Figs. 6, 7) as will be explained and is pressed upon by transfer pin 137, diaphragm 140, transfer pin 145, diaphragm 146 and by spring 147 retained by cap 183, the force of the spring 147 being varied by engine vacuum connected to passage 148.

The structures of Figures 4 and 5 are to show the mechanism for operating the parking brake acting on the toothed member 29 of Figure 1, which rotates with the output shaft 60.

The pawl member 90 is mounted for limited rotation, its shaft 91 being supported in casing 100, and its teeth 92 are formed to intersect the teeth 93 of carrier member 29 when the pawl is rotated counterclockwise. The pawl retracting spring 94 has one end bearing against the adjacent casing wall and the other end is hooked to apply a clockwise force to the pawl 90.

The shaft 89 is fitted to support arm 95 for rotation, the swinging end of the arm having a rounded channel formation, presenting outer guide faces with a roller 109 pinned to act as a pawl contact member to move pawl 90 into locking position. The adjacent edge of the pawl 90 is cut into a series of scalloped portions 96 from right toward the left, the final or terminal form of the cut at the left being that of a shallow cam 96a. The length of the arm 95 from the center of the shaft 89 with respect to the permissible motion and thickness of the pawl 90 is such that when the arm 95 is in its extreme counterclockwise position, the teeth 92 of pawl 90 are positively seated in teeth 93.

The shaft 89 rotates in concordance with the movement of the manual valve 130 of Figure 6. The station positions in counterclockwise sequence are "reverse," "low," "high," "neutral" and "parking brake," denoted by the letters R, L, H, N and P, respectively.

The arm 95 is moved by a flexible link in the form of spring 97 located about shaft 89, the spring end 97a fitting a hole drilled in the outer portion of the arm 95. A member 98 is rotatable with the shaft 89, is forked at 99 for connection to external control link 108, and is formed with lateral finger 99a intersecting the adjacent end of the spring 97. Movement of the external control toward parking position delivers force thru spring 97 to rock the arm 95 counterclockwise in Figure 5 for initial engagement of the pawl 90 with the carrier flange teeth 93. If the vehicle is still in motion, the rounded tooth ends tend to reject mesh of the pawl teeth at 92, 93 and the spring 97 yields. During this action, the control force applied by the external control opposes that of the pawl spring 94. The left end of shaft 89 is supported in a portion of a lever 108 which operates the control valve 130 of Figure 6.

Carrier 28 ceases rotation when the vehicle motion is stopped, the stored energy in spring 97 seating the pawl teeth 92. Once seated, the arm 95 is normal or perpendicular to the pawl cam face 96a so that the flange teeth 93 cannot force the pawl teeth 92 out of mesh.

The arm 95 with roller 109, and the pawl cam face 96a permits easy disengagement of the pawl 90 even if the vehicle is parked on a grade, because the holding force of the arm is removable without any resistance from the vehicle torque, and the rounded teeth thereupon may force the pawl out of engagement, aided by spring 94.

The scallop portions 96 on the edge of the pawl 90 adjacent the end of the arm 95 serve as station feel poppets for positioning of valve 130 of Figure 6, as will be understood further below. The roller 109 by reason of its small diameter is capable of release action with very little force applied thru spring 97.

Figure 6 shows a sectional view of the pressure regulation modulator valve mechanism shown in Figure 3 utilized to determine with considerable accuracy the instantaneous value of the controlled pressure provided by the regulator valve 125.

The casing portion 100 is formed with the various passages shown, and is equipped with bore 124 for regulator valve 125, and with bore 126 for the manual selector valve 130.

The bore 124 is ported in order from the right at 127, 128, 129, 131, 132 and 133. The valve 125 has bosses $a$, $b$, $c$ and $d$ as shown, and a stem portion $e$ protruding from the casing, and spring 134 tending to hold the valve 125 inward in the bore 124, the right portion of the spring 134 seating in a recess of the modulator casing 181.

The smaller portion of the stem $e$ is guided axially in an aperture of casing 180 and is pressed upon by multiplier arm 135 pivoted at 136 in the casing portion 180. As shown in Fig. 3 a transfer pin 137 guided in a boss 138 of casing portion 182 bears against the arm 135 and is borne upon by the diaphragm 140 of Fig. 3 clamped between portions 181 and 182 of the casing. Fluid pressure passage 141 is open to space 142 to the right of the diaphragm 140, and passage 143 as shown in Fig. 7 is open to space 144 at the left of the diaphragm 140.

A second transfer pin 145 is guided in an aperture of the casing portion 181, and is borne upon by a second diaphragm 146 clamped between portions 181 and 183 of the casing, and is pressed inward by spring 147 recessed in the casing portion 183. Passage 148 is connected to the intake manifold of the engine, so that the force of spring 147 upon transfer pin 145 is varied by the vacuum conditions of the manifold as determined by the engine speed and throttle opening.

It will be seen further that there are five forces operating upon the setting of the regulator valve 125, that of the spring 134, the forces on either side of diaphragm 140 derived from the converter inlet and exit pressures, the force of spring 147 and the varying force of the engine vacuum on the action of spring 147.

There is still another force exerted on valve 125, derived from the regulated main line pressure. The pumps feed into main line 162 and into space 133 by passage 123 and this pressure is effective on the face of boss $d$, tending to move the valve against spring 134.

The primary regulation action is for the outlet or regulated pressure of valve 125 to tend to spill excess pump pressure past the left edge of boss $b$ as seen in Fig. 6 back thru relief port 128, occasioned by the rise of pressure below boss $d$ in space 133.

The tendency is for a diminished delivered pressure to shut off relief leakage at port 128 by there not being sufficient pressure beneath boss $d$ to overcome the force of spring 134, whereas a rise of delivered pressure to a value greater than determined by the calibration of spring 134 will tend to open the relief at port 128 wider. There is an equilibrium pressure condition wherein the delivered pressure force below boss $d$ exactly balances the calibrated spring force. This description at this point has covered the self-regulation of valve 125, but not the modulation effects applied by the engine vacuum and the converter inlet and exit pressures affecting the action of the diaphragm 140.

The overall effect of the vacuum-responsive portion of the modulator device of Figures 6, 7 to 11 and 14 is to provide a constantly available pressure regulation for valve 125 under all driving conditions, so that with high torque demand as called for by the vehicle driver in advancing the engine throttle, the force of modulator spring 147 becomes instantly available for increasing the leading of stem $e$ of valve 125, which requires a greater force to move the stem to venting position at port 128, and thereby raises the effective regulated pressure available in main line passage 162 and the servo actuator passages connected to it by valve 130.

At light or idling throttle, the degree of engine vacuum effective in line 148 to move diaphragm 146 is relatively high, and the force of spring 147 is diminished or eliminated. This results in valve 125 providing a regulated pressure range of minimum or near minimum value, as determined by the other forces acting on the valve 125.

The response of the diaphragm and spring 147 is not only conditioned by the engine throttle variation, but also by changes in the overall load of the vehicle such as induced by encountering up-grades, and is likewise conditioned to some extent by the encountering of a down-grade, which by lightening the load on the engine, would cause the degree of vacuum to rise and transmit a signal which would diminish the effective line pressure. Under this condition, it is therefore desirable to intercept this action or render it less effective to drop the line pressure to minimum, especially in the higher ranges of vehicle speeds—since it is necessary to maintain a useful margin of line pressure, so that if the operator desires to change to low range, for increased engine braking—some other control force is then utilized to apply a secondary modulation effect, and maintain a higher level of minimum line pressure increasing with speed.

Therefore the converter inlet and exit pressures are made effective thru the pressure effect on the diaphragm 140, as will be understood by reference to the specification description of the effect of the converter inlet and outlet pressures on the diaphragm 140 of Figures 7 to 11.

As will be understood further in connection with the description of Figures 14 to 16, wherein the converter modulation pressures are replaced by line pressure when in low gear, only the diaphragm 146 is needed, the operating parts linking the diaphragm 146 with the lever 135 assuming other forms and characteristics, described below in detail.

The regulator port 127 is connected to two passages 151 and 152, the passage 151 leading to the brake release space 85 of the low band servo mechanism as shown in Figure 3, whereas the passage 152 is open to the cylinder 49 of the direct drive clutch servo mechanism of Figure 1.

The boss $a$ of valve 125 is of larger diameter than boss $b$, hence as will be understood further, a pressure in passages 151 or 152 would tend to act differentially upon the exposed adjacent cylindrical areas of these bosses, having a net effect of lifting the valve 125 against the spring 134, to lower the regulated pressure.

Reference is now made both to Figs. 6 and 7. The port 128 is open to the suction of both pumps P and Q, in passages 153 and 154, and to the sump passage 155.

The port 129 is open directly to front pump delivery passage 156, and to main line 162 through port 157 of double-check valve 160.

The port 131 connects to feed passage 161 leading to the converter working space.

The port 132 is open to the main line 162 leading to port 172 of valve 130.

Bleed orifice passage 123 connects the inner end of bore 124 to the passage 162.

The valve body bored at 126 for manual valve 130, which is pivotally connected to arm 108 of control shaft 89.

Port 171 connects to passage 170 leading to cylinder 65 of the reverse band servo mechanism.

Port 172 is open to main line 162 to receive regulated pressure from regulator valve 125.

Port 173 is connected to passage 187 leading directly to the apply side of the low band piston 84.

Port 174 is open to passage 184 leading to the direct drive clutch cylinder 49, thru orifice 197 shown in Figure 9.

Port 175 is open to exhaust.

Port 176 is connected to passage 190.

Port 177 is open to converter inlet passage 168.

The port 178 is open to passage 191 leading to passage 143 of the modulator mechanism of Figure 3.

Port 179 is open to converter exit passage 165 and port 167 is a vent for conduit 190. The spring 160 has two arms 160a and 160b each forming an independent normally closed check valve for the front pump P and rear pump Q respectively. Either pump alone, or both pumps together can open one or both check valves, as the case may be to supply oil to main line 162. Whenever front pump pressure exceeds rear pump pressure valve 160b is closed, and the front pump supplies the entire requirements of the system. Conversely, whenever the rear pump pressure is greater that pump supplies the system and the front pump check valve 160a is closed.

A pressure relief valve 192 is exposed to the pressure in port 172 and consists of an exhaust-connected sleeve 193 containing a loading spring 194 for check ball 195 seated at 196 against the pressure in port 172.

The Figures 7 to 11 show the elements of the fluid pressure system for the operation of the structures of Figures 1 to 6.

With the control for ratio selector valve 130 set for neutral "N," the valve is stationed as in Fig. 7. Boss f vents reverse line 170 at the open end of bore 126, preventing servo fluid from reaching line 170 by blocking the input port 172, while overpressure valve 195 remains operative. Ports 173, clutch line 184 and low brake line 187 are vented at port 175.

Land j opens port 167 to vent passage 190 which is in turn connected to passage 141 of the space 142 above diaphragm 140 of the modulator mechanism at the top of the drawing. Port 177 is blocked by boss h of valve 130, therefore there is no connection for passage 168 connected to converter input 161. Port 178 is connected to line 191 leading to passage 143 and the space 144 below modulator diaphragm 140, and boss i permits connection between this line and passage 165 connected to the converter outflow system.

Pump P is furnishing oil to line 156, but since the vehicle is standing still, pump Q is idle and not delivering pressure to line 159, hence double-check valve 160 closes port 158, while pressure in port 129, passages 156 opens 160 at port 157 to deliver oil to passage 162, the pressure of which thru the connection of passage 123 with space 133, tends to lift the valve against spring 134 toward the regulation point where the lower edge of boss b will rise to vent the line at relief port 128.

Pressure between the bosses c and d of valve 125 does not directly affect the regulation action of 125 since the bosses c and d are of equal areas; and the port 131 delivers pressure to converter feed passage 161; and the flow from the converter thru passage 165 passing thru orifice 201 and line 202 to the thermal valve space 205 to the cooler 211 and by the passage 212 to the lubrication system.

Since the passage 190 is blocked at 177 from the converter feed-connected passage 168, there is no force available above diaphragm 140 to apply pressure on modulator arm 135 for increasing the pressure in 156, 162 thru the variable load action of 135 upon the stem e of valve 125; and further, the converter outflow pressure in passage 165 appears in ports 179, 178, line 191 and passage 143 tending to lift the diaphragm 140.

If the engine is idling, the high vacuum lets diaphragm 146 oppose spring 147, but the engine may be raced, and cause a diminishing of the effective vacuum, so that spring 147 may press diaphragm 146 downward against the upward force created by the converter outflow pressure in the space under diaphragm 140.

With the control for valve 130 operated to shift to low speed ratio, the valve 130 is moved upward to the Figure 8 position. Boss f blocks reverse port 171 and regulated pressure from main line 162 is admitted by ports 172, 173 to the apply end of brake cylinder 85, thru passage 187. Boss g is stationed to exhaust the high clutch line 184 at 175, and boss h rises to permit converter input pressure from 168 to pass thru ports 177, 176 to passage 190 and 141 for applying converter input pressure to the top of diaphragm 146. Boss i permits the converter exit pressure in ports 179—178 and lines 191 and 143 to urge diaphragm 146 upward.

Brake 50 being applied by piston 84 on drum 37, drive proceeds in low gear.

The regulation effect of the converter input and output pressures upon valve 125 thru the agency of the modulator mechanism is described further in detail below.

During drive in low, pump Q being driven, now delivers pressure to passage 159, opening valve 160 at port 158 to add its pressure to that effective in passage 162 and its connected ports and passages. When the pressure of Q exceeds the pressure of P the right hand blade 160a of 160 is seated at 157 by the pressure in the passage 162 and between the blades, prevents backflow into passage 156. The pressure in space 133 to lift valve 125 to connect exhaust port 128 to feed port 129 from pump outlet passage 156. When this occurs, the front pump P can then idle, being subject only to whatever light circulation load or resistance appears in the relief passages 153, 155 and 154.

Feed to the converter working space is thru orifice port 131 from the bore 124 of valve 125, to passages 161 and 168 and the radial space between impellers 6 and 5. The fluid from the working space is circulated inward radially between turbine O and reaction wheel R–1 to passage 165, the pressure reacting from passage 165 upon the inner face of valve 200 whenever the outlet pressure is greater than the inlet pressure, to open the valve 200 and connect momentarily both the inlet and exit converter pressure-connected spaces. The outflow from the converter passes thru orifice 201 in passage 202 leading to the thermostat valve 203 and to the cooler feed line 210. The pressure differential valve 200 is not spring loaded, but only responds to any rise of converter exit pressure above the instant inlet pressure value, to equalize these pressures by circulating fluid from exit direct to inlet. This guarantees that the converter cannot ever generate a "positive" modulator pressure, that is, exert on the modulator a higher outlet pressure than inlet pressure.

The converter exit pressure appears in passage 165 connected to port 179 of valve 130, and on the underface of modulator diaphragm 140, thru the connection 191.

The converter inlet pressure appears on the upper face of diaphragm 140 thru the connection 190.

The control requirements for the proper operation of the regulator valve by the converter pressure differential, inlet to exit, are such that a "negative" pressure characteristic is desired—which is to say that the inlet shall always be greater than the exit pressure—guaranteed by the operation of differential valve 200.

Translating this to the desired action of the diaphragm 140 of the modulator mechanism for the regulator valve 125, it is desirable that the pressure to the right of the diaphragm be always greater than that to the left, as viewed in Figure 3, when operating in low.

During drive in low, it is desirable to maintain a substantial holding pressure on the low band 50. Whenever the front pump is unloaded pressure in main line 162 is controlled by the amount of opening of port 129 by the lower edge of boss c of valve 125. For this, the stem e of valve 125 is variably urged downward against the upward pressure below the valve in space 133, and the arm 135 exerts a variable force on stem e in accordance with the total effect of spring 147, vacuum above diaphragm 146, and the converter differential inlet and exit pressures on either side of diaphragm 140.

The detail of the modulator effect is given below in connection with the overall statement of operation.

In Figures 7 and 8 in the lower right corner a broken-away section of the casing space at the right of the gear train support is shown, with lubrication pipe 212 connected to space 240. The shaft 60 is pierced and drilled for lubrication flow from pocket 240 to the transmission bearings and gears. The centrally drilled passage 241 in shaft 60 has radial inlet 242 and axial outlet 243. Referring to Figure 1, the shaft 11 is hollow, it connects with passage 241 and it connects to radial outlets 244 and 245, the outlet 245 feeding to the space at the left of sun gear 27 and the outlet 244 opening into the shaft space inside collar 23 for flow to the web space of clutch hub 43. The bearings 51a and 51b are directly lubricated from pocket 240, which is under a constant pressure about 4 pounds above atmospheric in practice.

Figure 9 shows the selector valve 130 positioned for drive in direct, delivering from feed port 172 to both the low gear port 173 and the clutch feed port 174. Boss f is drawn down to connect reverse port 171 to end exhaust; bosses g and h isolate exhaust port 175; boss h blocks port 176 so that converter inlet pressure does not pass thru the loop portion of 190; bosses h and i connect ports 177, 178 to admit converter inlet pressure from passage 168 to passage 191 leading to the underside of modulator diaphragm 140; and bosses i and j connect ports 179 and 167 admitting converter exit pressure from passage 165 to passage 190 leading to the upper space 142 above diaphragm 140.

The invention herewith embodies a special feature which in combination with the other features described, provides a useful result worthy of special attention. Reference has been made to the connection from the clutch cylinder 49, passage 152 to port 127 of the regulator valve 125, and passage 151 leading to the release side of low range piston 84 in cylinder 85.

It should be first observed that there is no pressure fed to these passages and pressure spaces except when the manual valve 130 is in the direct drive position of Figure 9 to feed regulated pressure to the port 174, line 184, orifice 197 and cylinder 49. When this manual valve setting is in effect, the line pressure is also fed to the passage 187 which in the low range setting of Figure 8 feeds pressure to the brake-actuation side of piston 84 of the low range cylinder 85.

In the direct drive control setting of Figure 9, it will be noted that the piston 84 is subjected to pressure on one side delivered by line 187, and on the other side delivered by line 151. Since these pressure values are both equal, the piston 84 is not moved by either pressure force, but is under the force of spring 86 which holds the piston 84 so as to permit 81 in Fig. 3 to hold the low range brake 50 released.

Consequently if the clutch cylinder 49 is drained by movement of valve 130 from direct drive to low position, the rate of release of pressure from the release end of the cylinder 85 is controlled by the orifice 197, and this controls the corresponding movement of piston 84 to set the low brake. It is noted that the brake-actuation pressure is already in the actuator end, by the connection of passage 187 to main line at port 172 of valve 130. This change-over may be visualized as one in which the required loading force for the brake is held in equilibrium by the existence of clutch loading pressure, and when the equilibrium is upset by the removal of the clutch loading pressure, the brake actuator force is already waiting to act, as rapidly as permitted by the regulated release of the clutch pressure from the cylinder 49.

Now, in Figure 8 for describing the control settings for drive in low range, it is seen that the brake release spring 86 is held off by pressure in cylinder 85 fed thru line 187 from port 173 of valve 130, and that clutch feed port 174 is open to exhaust.

When the valve 130 is then shifted to the direct setting of Fig. 9, the pressure which had been exerted to hold band 50 applied, is not exhausted, but its effect on piston 84 is diminished by the rise of clutch pressure as further exerted in 151 passages 152 and thru port 127, and fed to the release end of cylinder 85, the rise of the brake release pressure continuing until the fluid pressures on either side of the piston 84 are again equalized, by which time the brake 50 is fully released.

This peculiar system and principle of obtaining alternate direct clutch and low range brake application enables a very close overlap control to be exercised over the change speed interval for both upshift and downshift, and prevents any possible run-away of idling or unloaded transmission members. Directing attention to the status of the sun gear 35 and drum 37, these connected elements are never, during the operating cycle, free of restraint or of control, since the oil body under pressure in the connecting passages between the release end of cylinder 86 and cylinder 49 serves as a definite link in the clutch actuator and brake release forces which assures complete coordination during the shift in either direction, and makes possible accurate timing of the shift.

Other noteworthy response actions occur during these upshift and downshift intervals, such as the timing effects derived from the phasing of the directional wrap of the low range band 50, and the resulting dropping of the regulated pressure in space 162 by the existence of differential forces on valve 125 when there is pressure in cylinder 49, line 152 and port 127. These response actions are further explained herein in detail.

As noted preceding, the boss a of valve 125 is of slightly larger diameter than boss b, so that the existence of a pressure in the passages 151 and 152 in port 127 would tend to decrease line pressure by urging the valve 125 against the spring 134 whenever there is pressure in the clutch cylinder 49.

When the valve 130 is moved from the Figure 9 position to that of Figure 8, for shift to low range, boss g moves upward to expose the clutch feed port 174 to exhaust at 175, but leaving the low gear port 173 still connected to 172 for actuating piston 84 to load band 50 on drum 37.

The self-regulating pressure effect occurring in the clutch-releasing and brake-applying interval is to be examined carefully at this point. If the valve 125 as influenced by the modulator mechanism has established or is establishing a relatively high pressure in the main line 162, this pressure value will appear in the clutch cylinder 49 prior to the downshift movement of the control lever 290 to the low range position, and the exposure of the clutch port 174 will initiate a pressure drop in the feed passage 184 ahead of the orifice 197. The pressure in 49 is the same as in passage 152, port 127, passage 151 and in the pressure release space of brake cylinder 85. The tendency of the regulator valve 125 is therefore to oppose spring 134 and thus maintain in the main line a lower pressure than would be maintained with the clutch chamber 49 vented.

A tendency is therefore established for widening the aperture between the lower lip of boss b and the lower edge of port 128, and relieve the regulated pressure, creating a pressure drop reflected in passage 162 and the connected passages. Under these circumtances, the timing of the transition to full brake application by piston 84 is accelerated, which reduces the potential slip of the band 50, prior to full stopping of the drum 37.

As shown in Figs. 1, 9, a feature of the clutch control system is provided by a small blade valve 39 pinned to the drum 37, consisting of a self-spring piece normally tending to seal the aperture 26 of the cylinder space 49. The piston member 44 is pressed to the left by the clutch spring 48, this action opening valve 39 by applying thrust to thrust pin 39', numbered in Fig. 9, but not in Fig. 1. When oil under pressure is admitted to cylinder 49 faster than it can flow out thru opening 26 the piston 44 moves to the right, and valve 39 seals aperture 26 because the force of the spring 39 is greater than the force of clutch apply pressure on the area of the valve. When the pressure is released, the automatic leftward travel of piston 44 opens valve 39, to provide a quick clutch pressure release, the centrifugal force of the contained oil body assisting this action at high speeds of drum 37, when that force is sufficient to force valve 39 open.

In Figure 10 which shows the reverse drive conditions, valve 130 is set to deliver regulated pressure from port 172 to port 171 and to passage 170 leading to reverse cylinder 65 for actuating piston 66 to apply band 55 to drum 51 of annulus gear 38. Boss $f$ seals the bore end exhaust passage; boss $g$ isolates the pressure above it, and connects ports 173 and 174 to exhaust at 175; boss $h$ and boss $i$ are stationed to connect ports 176, 177 so that converter inlet pressure is connected to passage 190 leading to the upper side 142 of diaphragm 140; bosses $i$ and $j$ are placed to connect ports 178, 179 so that converter exit pressure in passage 165 is available to passage 191 leading to the lower side 144 of the diaphragm 140.

The regulator valve 125 is subject only to the positive pressure furnished by pump P, the pressure delivered to valve 160 filling the space connected to passage 162 and sealing the port 158 of passage 159 against the robbing effect of pump Q which in reverse, rotates backward.

When pump Q rotates reversely, it tends to apply suction to passage 159 and to move fluid in opposite flow direction in passage 154.

As will be understood from the description following, of the modulator mechanism and its action on the values of regulated line pressure, the net regulated pressure for applying the reverse band 55 is augmented so as to provide a high gripping force to deal adequately with the torque reaction force of drum 51.

In Fig. 11, the pressure regulator valve 125 is not effective, since the vehicle drive control is set for neutral, and the control for valve 130 as described in connection with Figs. 4, 5 and 6 has shifted the valve to the limit of downward travel in Fig. 11, or the limit of leftward travel in Fig. 6.

Since the vehicle cannot be towed or otherwise moved when pawl 90 locks the member 29 against rotation, there can be no fluid pressure supplied by the pump Q to passage 159. If the engine be started, and pump P furnishes pressure to passage 156, the space 162 is supplied by the right hand blade of check valve 160 and there is pressure to port 172 of valve 130, which is relieved by the upper end porting to exhaust.

The passages 165 and 168, connected to the converter working space are prevented from draining by bosses $g$, $h$ and $i$ of valve 130, so that when the control shifts valve 130 to neutral as shown in Fig. 7, these passages are likewise blocked. When the engine starts, pump P therefore does not have to fill the whole converter working space capacity, but only the fraction above the drain-down level sustained by the blocked connections. It should be noted that boss $c$ of valve 125 blocks drain from passage 161 in Fig. 11, and bosses $c$ and $d$ likewise in Fig. 7.

With no pressure to lift valve 125, the spring 134 will shift the valve to the bottom of its stroke as shown in Fig. 6. The spacing at bottom point in the diagram of Fig. 11 is left for clearer understanding, it being assumed that a spacer stud at the valve end may be used to assure the desired linear blocking action described.

The thermostat valve 203 of Figs. 7 to 11 consists of a thermal blade 204 pinned at one end in the input space 205 and bent at the other end to force the ball valve 206 off its seat against the force of spring 207. The inlet pressure feed is from passage 202 to space 205, and the flow may proceed by passage 208 direct to the cooler 211, and when the blade 204 has unseated the ball valve 206, the flow may pass thru to passage 212 leading to the lubrication feed main 241, the ball check valve 213 being lifted from its seat by the pressure acting against the force of spring 214.

Cooled oil from cooler 211 flows by passage 215 to the space 216 between passage 208 and the seat of check valve 213.

The blade 204 normally holds valve 206 off its seat so that there is dual flow to cooler inlet passage 210 and flow to passages 208, 212, the cooled oil from passage 215 joining the lubrication flow at the point above valve 213. When the flow from the converter working space in passage 202 rises in temperature, the blade 206 bends away until it no longer can overcome spring 207, and valve 206 closes off the direct flow to passages 208 and 212, forcing all of the converter outflow in passage 202 to pass thru the cooler before reaching lubrication feed passage 212.

Reference above, in connection with Figures 7 to 11 has been made to the fact that the passages 161 and 202 connected to converter inlet and exit, are equipped with restrictions or orifices 131 and 201 respectively.

The applicant has found that the pressure values derived from the inlet and exit passages within the orifices 131 and 201, such as are admitted to the modulator mechanism by the ports 176 to 179 and 167 of valve 130, vary with respect to the converter operating conditions; and at or near stall when the circulation velocity of the working space oil body is relatively high, the outlet pressure becomes greater than the inlet pressure. This condition is not desired for obtaining the control characteristics suitable for the required action of the present modulator mechanism, therefore the differential-pressure-responsive check valve 200 of Fig. 1 and the diagram figures will open under the increased outlet pressure and spill the excess back to the inlet passages. This temporary condition has been called the "positive" pressure phase as distinct from these pressure relationships when developed under further converter operation at lesser torque multiplications.

When the torque ratio of converter of the present invention decreases to some particular value, the inlet pressure in passages 161 and 168 rises above the exit pressure value in passage 165, and remains above same during the later fluid flywheel coupling stage. This may be termed a "negative" pressure phase.

It seems advisable to trace thru the diagram figures the various operative phases of the converter pressure modulator system so that the characteristic effects on the regulator valve 125 and its resultant regulated pressure values will be entirely clear.

In Figure 7, for neutral, converter inlet pressure is blocked by boss $h$ of the valve 130, and the exit pressure is connected to the lower side of the diaphragm 140, having the net effect of reducing whatever pressure increasing forces the regulator valve 125 may receive otherwise from the system. In Figure 8 for low range operation, the inlet pressure is delivered to the upper side of the diaphragm 140 and the exit pressure to the lower side. In Figure 9 for direct, converter inlet pressure is directed to the under side of the diaphragm 140 and converter exit pressure to the upper side. In Fig. 10, for reverse, converter inlet pressure is directed to the upper side and the exit pressure to the lower side of diaphragm 140.

Considering the effects of the foregoing conditions on valve 125, and remembering that the check valve 200 prevents exit pressure from rising above the inlet pressure, the net control pressure effects resulting from the arrangement may be tabulated as given futher below.

Referring the described pressures back to the diaphragm of the modulator mechanism, by the passages 141 and 143, it will be understood that the operating conditions for valve 125 with respect to the action on it by the converter pressure regulation effect may be tabulated in accord with the various selection positions of valve 130.

|  | Converter Space Connections | | Pressure Regulation On Valve 125 | |
|---|---|---|---|---|
|  | Inlet | Exit | Inc. | Dim. |
| Fig. 7, Neutral | (Blocked) | X | 0 | X |
| Fig. 8, Low Range | X | X | X | 0 |
| Fig. 9, Direct | X | X | 0 | X |
| Fig. 10, Reverse | X | X | X | 0 |

(X indicates pressure action.)

It will be noted that in direct the dominating inlet pressure is switched to exert a lowering effect on the regulated pressure whereas in the other ratio or drive positions it is applied to raise this pressure over a variable scale.

The line pressure, in increasing with throttle opening permits maintenance of sufficient excess regulated pressure to handle all abnormal torque demands which otherwise could cause slip of the torque-sustaining elements.

The following representative tabulations cover field tests made of the construction shown in the drawings:

| Speedo., Miles per Hour | Pressures Lbs. Sq. In. at Full Throttle | Pressures at Idle Throttle Overrun | Difference Pressures Between Thr. Ranges |
|---|---|---|---|
| 5 | 125 | 68 | 58 |
| 10 | 125 | 80 | 45 |
| 15 | 130 | 93 | 37 |
| 20 | 140 | 100 | 40 |
| 25 | 154 | 108 | 46 |
| 30 | 168 | 120 | 48 |
| 35 | 175 | 140 | 35 |
| 40 | 180 | 150 | 30 |

Correspondingly, the available regulated pressures in direct drive will tabulate as follows:

| Speedo., Miles Per Hour | Pressures, Lbs. at Full Throttle |
|---|---|
| 5 | 80 |
| 10 | 85 |
| 15 | 89 |
| 20 | 90 |
| 25 | 90 |
| 30 | 89 |
| 35 | 85 |
| 40 | 79 |
| 45 | 71 |

The merit of the variable pressure effect, varying with vehicle speed lies in the constant creation of a margin of regulated pressure over and above need to sustain the drive up to all full torque demands, such as the pounds pressure at full-throttle shown above.

The manual valve operating lever 88 secured to shaft 89 in Figure 4 appears in Figure 12 where it is seen endwise, the end being apertured to receive the turned end of rod 279 pivoted in short arm 281 formed in the same piece with the longer lever 280, pivoted on the stud 282 mounted on the outer wall of the casing 100. As lever 280 is swung, the small arm 281 thru rod 279 swings lever 88 and rotates shaft 89 to the positions "P," "N," "D," "L," and "R," indicated.

The steering column 300 of the vehicle is fitted with bearing bracket 283 in which the lower end of selector shaft 285 is pivoted, the shaft 285 having an arm 284 secured to it. The arm 284 is pivotally fitted at 286 to link member 287, pivoted at 288 in the lower end of lever 280.

Rotation of shaft 285 swings arm 284 to reciprocate link 287 and move the lever 280 and arm 281 to and among the positions indicated, causing the shaft 89 to rotate for moving the valve 130 of Figure 6 and the parking brake device of Figure 5, as described.

As will be understood by further reference to Figure 13, the selector shaft 285 is rotated by control handle 290 clockwise thru the selector positions "P–N–D–L–R" and oppositely, counterclockwise, resulting in stationing lever 280 at "P" and at "R" for the limits of shift selector motion. This correlation will be seen by reference to Figure 5 and the poppet stationing of arm 95 and roller 109 in the notches 96 of pawl 90.

In Figure 13 the steering column 300 will be seen to support a casing 291 in which the upper end of shaft 285 is fitted for bearing alignment, this end of shaft 285 being forked to accommodate the sliding action of the inner end of selector handle 290 pivoted at 292 to the fork portion of shaft 285. The handle 290 is knobbed at one end, and is equipped with movable stop finger 293 at the other. The pointer 294 consists of an angular piece attached to the upper end of the shaft 285, projecting in a plane of rotational motion. A signal plate is fastened to the housing 291 and is marked for the shift positions, from left to right "P–N–D–L–R" as shown, for registry with pointer 294. A position stop plate 296 is attached to the housing 291, and is formed and placed to provide supervisory, permissive control over the handle 290. The shift sequence herein is more effective in guarding against wrong motion if the allowed planar rotation of handle 290 and shaft 285 be given a dwell feel for warning the driver, therefore to halt inadvertent application of the reverse band 55 of Fig. 2, stop 297 of plate 296 prevents direct planar motion of handle 290 beyond "L" to the "R" position, requiring the handle 290 to be rocked slightly by lifting the knob end, if one would apply the band 55 to drum 51 of gear 38 of Fig. 1. This lifting action, actually only a few degrees of motion, rocks handle 290 on pivot 292, depressing the finger 293 so as to clear the stop 297. A second stop 298 formed in piece 296 is contoured so as to permit passage of the finger 293 but without positive blocking of the motion, and only to affirm the desired poppet action likewise derived from the ratcheting action of roller 109 of arm 95 in Fig. 5 over the scalloped portion of pawl 90. Stop 298 is located between positions "L" and "D."

Spring 301 acts to reset the handle 290 in the normal planar rotation position for the three shift stations of the handle between the positive stopped end positions.

The construction of the modulator device of Fig. 14 provides a different method of obtaining increased pressures for high torque needs and for the regulation of the timing of the shift to and from drive in low range.

In Fig. 15 the modified manual valve 130' is shown.

In Fig. 14 the accumulator casing 250 is bored at 251 for plunger 252, and the end chamber 253 is connected to passage 254 which is the passage 254 in Fig. 15. Whenever the manual valve 130' is either in L, for low, or R for reverse position, accumulator passage 254 is connected to main line at port 272 thru passage 234.

The plunger 252 moves in bore 251, being urged upward against stop 256 by spring 255. Side passage 257 is located above the stop, and leads to the vacuum modulator device shown at the left.

The inner portion of chamber 253 is formed into ring-shaped seat 258 for plate valve 260, orificed at 261, and the plate valve 260 is seated by light spring 262 which may exert a low force of one to three pounds, for example.

The plate valve 260 is fitted with retainer 263 for spring 259 which holds a second plate valve 265 upward against a similar ring-shaped seat 264 formed on the underside of valve 260. The force of spring 262 may be taken at approximately 50 pounds, and that of spring 255 at 135 pounds.

Oil admitted to passage 254 and chamber 253 from main line passes thru the orifice to open valve 265 against spring 259 and build up pressure on plunger 252 to compress spring 251 and gradually build up pressure in the modulator.

The modulator device includes diaphragm 146 held between cap 183 and section 181, acted upon by engine vacuum admitted at port 148 to work against the force of spring 147, as before. The casing section 181 is bored to accommodate thrust pins 137 and 145, the pin 145 bearing against the lower face of the diaphragm 146 and against the upper end of pin 137 which protrudes from the casing 181 to operate lever 135, as before.

The adjacent ends of the pins 145 and 137 lie in enlarged space 266 connected to passage 257 open to the bore 251 above the plunger 252.

The application of a given pressure to modulator passage 254 and delivered to the space above the plunger 252 is therefore able to lift pin 145 upward against spring 147 while pressing pin 137 downward against lever 135, having the net effect of causing the regulator valve 130, loaded by lever 135 to create a higher regulated pressure in the main line 162 and connected servo control passages of the actuator system.

The effect of the staged accumulator arrangement acting thru the modulator device is to raise the minimum regulated pressure value so that when the low range band or reverse band is being actuated, there will be sufficient pressure to hold either band on the drum to prevent undesired slip, which would produce unnecessary wear and heating.

When the valve 130' is moved to release the low range band 50 in drive or neutral, but not in reverse, the connection of passage 254 to exhaust port 233 vents chamber 226 and permits the heavy spring 255 to move upwardly, unseat valve 260, so that the spring 147 and the upward forces acting on lever 135 will again bring the pins 145 and 137 into abutment.

In Fig. 15 the changes in valve 130 to set up a proper initial control for the construction of valve body 266 is bored at 126, and the valve 130' is provided with bosses f, g, h and i, as shown, comparable with similar bosses of valve 130 of Fig. 6.

By comparison with Fig. 6, it will be seen that in Fig. 15, the ports 171, 172, 173, 174 and 175 are the same, providing reverse feed, main line inlet, low band apply, clutch apply and exhaust in that order.

The valve 130' is shown in low range position, the line pressure from 162 passage thru ports 172-173 for delivery to passage 187 leading to the low range cylinder 185, to the brake-actuator side of piston 84. The direct clutch port 174 is connected to exhaust at 175. The reverse feed port 170 is open to exhaust at the end of bore 126.

There are three ports, 231, 232 and 233 in order to the left of boss h of valve 130', the first, 231 being connected to the main line pressure port 172, by passage 234, the second 232 being connected to passage 254 shown in Fig. 14, and the third 233 acting as exhaust or relief. As shown in Fig. 15, the modulator port 232 is connected to 231 for causing the Fig. 14 construction to exercise its pressure raising function.

The stations for valve 130' are indicated at the left, corresponding to the "P–N–D–L–R" notations of the other figures. The lever 108 of shaft 89 of the preceding figures operates valve 130' similarly to valve 130 of Figs. 4 and 6.

When the valve 130' is in reverse setting, the Fig. 14 structure is still fed thru port 232 and passage 254 from passage 234 and port 172. In direct, the port 231 is shut off by boss h, and 254 is joined to exhaust at 233, which condition also prevails in neutral.

If the vehicle approaches the crown of a steep hill, and the operator desires to utilize full engine braking in low range ratio, he need only shift the handle 290 of Fig. 13 to low range "L" position, and although the engine throttle may be at retarded or idling position, creating a high vacuum which removes the effect of spring 147, the modulator pressure acting between plungers 145 and 137 in Fig. 14 presses them apart, and loads lever 135 to act on stem e of valve 125, for raising the regulated pressure effective in 162 and the connected passages leading to the actuation system.

Whenever the vacuum chamber spring 147 is rendered inoperative, the regulated pressure provided by valve 125 tends toward minimum line pressure, since only the force of the spring 134 and the pressure acting on the end of the valve boss d are active. When in direct, this minimum value may approximate 40 p. s. i., and in low range would be about 78 p. s. i., these values increasing with throttle opening.

The Fig. 16 part section shows a modified accumulator casing 250' having plunger 252' held upward against adjustable stop 256' by spring 255 supported by retainer 267 which is lipped to act as a limit stop for the downward motion of plunger 252'. Adjacent smaller bore 268 is fitted with valve 269 urged by spring 270 to close the cross port 271 connected to the space above plunger 252' and to passage 257. The aperture 272 below plunger 269 is open to inlet passage 254 and to the larger concentric bore 247 in which a check valve assembly is located.

The check valve assembly includes a shell 274 pierced at 275 and crimped to grip plate 276 ported at 277 and disk valve 278 held on seat by spring 304 retained inside the upper portion of shell 221.

When pressure is admitted from inlet passage 254 of Fig. 16, plunger 269 is lifted against spring 270 to expose port 272 and deliver pressure to passage 271, and to the head of piston 252' to compress spring 255.

Disc valve 278 is held closed by its spring 304.

This operation resembles that noted above for the delivery phase of Fig. 14 construction. The plunger 252' is progressively lowered against spring 255 and the resistance being increased during this action, the net effect is a gradual rise of modulator pressure in passage 257, causing the structure at the left of Fig. 14 to operate for increasing the pressure maintained by valve 125. During this phase, plunger 269 remains above the opening of passage 271.

When valve 130' of Fig. 15 is moved to "D" from the "L" position, the passage 254 is connected to exhaust, and the disc valve 278 is impelled to open by the differential pressure between line 254 and 257, providing a quick relief, augmented by the force of spring 255 under plunger 252' and the force of spring 147 of Fig. 14.

If the valve 130' of Fig. 15 has moved from "L" to the "R" position, the passage 254 is not connected to exhaust at 233, and the modulation action is retained for holding the increased minimum line pressure at the same value it had under the "L" operation, which takes care of the need for higher actuator force on the reverse servo band due to its torque requirement.

It will be understood that the Fig. 16 construction is an alternative to that of the right-hand portion of Fig. 14, and that it is similarly connected by the corresponding passages to the valve 130' of Fig. 15 and the vacuum modulator device at the left of Fig. 14.

The two modulator controls operate in the same general manner, and the useful results obtained are the same, guaranteeing an increased regulated pressure for initiating and holding drive in low and reverse.

For operation of the construction shown in the drawings, the selector lever 290 of Fig. 13 is set in neutral "N," or in parking "P" position, so the engine starter switch may be engaged. When the engine is running, and the output shaft 60 is stopped, the impeller I of Fig. 1 is rotating at engine speed, and turbine O slowly turns sun gear 27 under a slight idling torque. The pump P driven from drum 4 quickly supplies the system of Figs. 7 to 11 with oil pressure whenever the engine begins to rotate.

Movement of lever 290 to drive position "D" for normal drive shifts the valve 130 from the Fig. 7 to the Fig. 9 position, feeding regulated pressure to port 174 and passage 184 from port 172, applying pressure in cylinder 49 against clutch piston 44 to compress the stack of clutch plates 40—45. This couples shaft 11, sun gear 27 and sun gear 35, locking the gear assembly for unitary rotation. The converter turbine O now coupled to the load, comes to rest. Bands 50 and 55 are released.

Opening of the engine throttle advances the speed of the engine and impeller I, developing a torque on the turbine O, and the vehicle moves, first slowly at maximum torque multiplication speed and progressively with rise of vehicle speed, at diminishing torque multiplication as described above, until the converter turbine O is driven at approximate 1-to-1 ratio. This point may be taken at 30 to 60 miles per hour, but in the example herewith is at approximately 50 M. P. H., for full throttle.

Closing of the throttle permits the car to coast, and the separate-working space blades 117, 120 provide engine braking. The vehicle brakes may be applied and the vehicle stopped, without any need to move the lever 290 to "N," since the idling of the engine reduces impeller speed to a potential torque-delivery value below a creep torque value of any consequence.

For establishing reverse drive, the lever 290 is shifted to move valve 130 from the Fig. 8 to the Fig. 10 position, to the end of lever travel. Pump pressure may flow from feed port 172 to port 171 and line 170 to reverse cylinder 65 to press piston 66 and bind band 55 on drum 51. Increase of engine speed applies torque to sun gear 27 and with the reaction effect of annulus gear 38 which is now stopped, shaft 60 rotates reversely, at a gear ratio in the present example of about 1.82 to 1, which is multiplied by the converter ratio, and varied toward diminishing torque multiplication with rise of engine speed, providing a very effective reverse drive system.

Drive in low range may be obtained by moving lever to cause shift of valve from the Fig. 9 to the Fig. 8 position. For all ordinary traffic purposes, this shift is not needed, but for emergency acceleration, maneuvering under poor traction conditions, multiplied engine braking on long downhill grades, and "2nd gear" climbing of steep hills, the low range is exceptionally useful; and additionally, the control apparatus for easy shift between low range and reverse makes it possible to rock a car out of mud or gravel beds, snow or ice patches, and the like.

In this Fig. 8 position the valve 130 directs the regulated pressure from port 172 to port 173 and line 187 for cylinder 85 to actuate the piston 84 to clamp band 50 on drum 37 and furnish torque reaction from sun gear 35, in the disclosed example providing a low range reduction of about 1.82 to 1, which is multiplied by the converter ratio as noted above.

As outlined above, the actuating pressures for performing these operations are varied and rather exactly controlled by the pressure-regulator valve 125 of Figs. 6 to 11 which determines the net effective pressure derived from the two pumps P and Q, as controlled by the hydraulic pressures developed by the converter, by the variations in the engine vacuum, and other variable controls. The net effect of the overcontrol on valve 125 in the Fig. 7 to 11 arrangement is to develop pressure response in accordance with throttle position, engine speed, vehicle torque and the torque demand, which control effects occur in varying proportions over the whole driving cycle, full throttle to idling, and under all variations of road conditions.

The working oil supply is based on the sump of space S as a reservoir, located under the transmission casing portion 100c. The oil is drawn thru a screen and suction passages to the suction inlets 153 and 154 for both pumps P and Q. Pump P is desirably of larger delivery capacity than pump Q, and is able to fill the system rapidly as soon as the engine starts, and to maintain full pressure for all low speed drive requirements. Over-supply is by-passed at 129 to the sump S or to the suction passage 153, reducing friction losses. When a given car speed is reached, for example 15 to 18 M. P. H., the pump Q driven by shaft 60 delivers sufficient oil capacity and pressure to supply the whole system, its pressure operating the valve 125 so as to relieve the pump P by holding open the relief passages therefor, further reducing the losses. The rear pump Q also serves to provide the required capacity and pressures, when the vehicle is towed to start a stalled engine.

The oil is circulated continuously thru the converter working spaces, maintaining them under a positive pressure at all times, assuring cooling circulation thru cooler 211, and gear lubrication circulation thru the passages connected to the lubrication line 212. Under heavy converter loads the rise of converter outflow temperature causes the thermal valve 204 to increase flow through the cooler.

In the understanding of the operation and actuation of the low range band 50 of Figs. 1 and 3, in starting from rest it should be observed that in the gear train, with a forward rotation applied to sun gear 27, long planet 30 will endeavor to rotate reversely about its own center, short planet 31 will endeavor to rotate forwardly about its own center, and hence if there be a torque reaction developed by braking the drum 37 of sun gear 35, drum must be restrained from rotating backward, that is, in Fig. 3 the drum 37 will try to rotate clockwise.

Now if piston 84 apply load to band end 76, there will be a self-energizing tendency of band 50 following which the creation of rising pressure on the piston 84 is wholly determined by the controls utilized to regulate the actuator pressure.

For shift to "L" from "N," the instant application of the low range band coupled with the force applied by piston 84 assures that there will be no slip of the drum, and all slip incident to starting will be handled solely by the torque converter.

In downshifting from "D" to "L," the drum 37 which had been rotating forward at engine speed, is retarded to zero speed by band 50, which has no self-energising action during this interval, therefore as the clutch plates 40—45 are relieved of their torque and drum 37 is retarded by the band 50, the transfer from direct coupling torque to reaction torque, under normal forward drive by the engine is accomplished by the fluid pressure alone, stopping the band 50 gradually as the clutch plates are unloaded.

Under overrun downshift, such as in coasting down mountain grades, for low range engine braking, there is no self-energised band action, a smooth shift action is accomplished by the character of the regulated line pressure, used to engage and hold the band 50. This is explained above in connection with Figs. 14 to 16, as well as in the earlier description of the converter and vacuum controlled pressure modulation.

When the drum 37 comes to zero speed and the negative torque-reaction component becomes sufficient to cause it to revolve backward, at the instant it endeavors to do so, the self-wrapping action indicated by arrow X begins, and the self-locking force is added to that of the fluid pressure. The band therefore has an initial phase when it is progressively loaded by the fluid pressure while the drum is being decelerated by the gear torque coupling effect, and a second phase when its torque reaction on the band generates a proportional self-wrapping force augmenting that of the fluid pressure.

These effects occur very quickly, and result in fast response to the operator's ratio selection movement of the control lever 290 and valves 130 or 130', as described. This feature also makes the downshift transition smooth, since while the capacity of clutch 40–45 is still appreciable, there cannot be any self-wrapping action.

The operator may therefore shift the ratio selector for downshift at high vehicle speeds for emergency acceleration purposes, and obtain a clean-cut, timed shift with a marked lack of the surges or jerks which in this art have come to be known as torque-fight. This fundamental feature is further augmented by the automatic actuation pressure controls described above.

In upshifting from "L" to "H," the clutch plates 40—45 are progressively loaded by the pressures delivered by the controls, and the net line pressures provided during this shift are lowered as explained further above.

The low range drum 37 which had been stopped by brake 50 now tends to rotate forwardly or counterclockwise in Fig. 3. The band holding pressure is diminishing and the clutch pressure is rising in cylinder 49. Whenever the clutch capacity rises sufficiently to cause the drum 37 to rotate forwardly, positive low range torque reaction ceases.

The forward directional motion of drum 37 now tends to deenergize the band 50 at end 76 where before it had been self-energised. With a diminishing brake pressure and under this band de-energising condition, there is no torque fight and the transition to direct from low range is accomplished smoothly, and quickly. It is not desirable or necessary to load the clutch 40—45 with the same line pressure which had been used to provide low range drive, since the overall torque requirement as reflected in needed capacity and corresponding line pressure is less for direct than for low range operation.

Conversely, in applying reverse band 55 of Fig. 2 to drum 51, since the annulus gear 38 receives a forward torque component for its torque reaction, from planet 31, the application of servo pressure to piston 66 results in moving brake band end 52 to the right, and the drum 51 having a torque reaction component indicated by the arrow Y at the left of Fig. 2, it will be seen that there is an interval when the movable band end 52 will be drawn down on the drum, and self-energise. It will endeavor to wrap immediately.

As the piston 66 slides on rod 67 it gradually loads spring 71 to apply band 55 gradually before the piston engages the stop 72. Apply pressure in the cylinder is increased gradually during this interval by slow flow thru the restricted orifice 305 in conduit 170, shown in Figs. 2, 7 and 10.

These features make it possible for the driver to rock a vehicle out of a poor traction spot by alternate "L" and "R" shift, without spinning the driving wheels or embedding them in mud or snow, and this shift is negotiated easily and readily, by inexperienced drivers, due to the safeguards against torque shock afforded by the construction.

I claim:

1. In a fluid-pressure-controlled power transmission assembly for delivering the power of a vehicle engine to the vehicle wheels at variable speeds and torques, an output shaft connected to drive said wheels, a fluid torque converter having a fluid working space in which are located an input member driven by the said engine and an output member, a change-speed gear unit driven by said output member and driving said output shaft, a fluid pressure circulating and pressure-developing system supplied by power obtained from rotation of said engine and said output shaft, including two pumps one driven by said engine and the other by said output shaft, clutch elements within said unit adapted for engagement to provide direct drive between said output member and said output shaft, gear drive elements actuable to provide reduction drive between said output member and said output shaft, fluid pressure operated mechanism for actuating said elements, selective valving in said system for directing the pressure of said system to said mechanism, pressure-regulating valving for said fluid system for controlling the degree of said actuating pressure and a mechanism for modulating the action of said pressure-regulating valving made operative by fluid pressure connections to said fluid working space.

2. In the combination set forth in claim 1, the subcombination of a manifold for said engine in which variations of vacuum pressure occur in accordance with changes in the load and power conditions of said engine, and a member of said modulating mechanism adapted to respond to such vacuum pressure and connected to said manifold.

3. In the combination set forth in claim 1, the subcombination of said selective valving consisting of a manually movable valve, a valve body for said valve ported to receive the pressure of said pumps and to deliver same to said actuating mechanism and ported to intercept the said pressure connections between said working space and said pressure-regulating valving, and an arrangement of bosses on said manual valve for selective connection of said valve body porting made effective by successive positioning of said valve to deliver pressure to said mechanism and to control the connection of the said fluid working space pressure to said valving.

4. In the combination set forth in claim 1, the subcombination of said selective valving consisting of a manually movable valve shiftable to predetermined operative positions for directing the pressure of said pumps to said actuating mechanism, a manual control lever for moving said valve to and from said positions, a zero-speed brake device for the rotation of said output shaft and a linkage connected to said lever for operating said brake in one position of said lever, said linkage including a flexible force-applying element effective to pre-set said brake during intervals of rotation of said output member.

5. In the combination set forth in claim 1, the subcombination of said pressure regulation valving consisting of a loading spring and a valve located in a valve body having a pump pressure port, a relief port and a regulated pressure space, said valve being urged to move against said spring by the pressure of said regulated pressure space against the force of said spring, and a connecting passage delivering the pressure of said space to said selective valving.

6. In controls for fluid pressure actuated change-speed gearing, an engine, a device arranged to respond to the power and load conditions of said engine, said device providing dynamometric measuring of said conditions, a change-speed gear unit having an input shaft an output shaft and having a train of gearing of said unit adapted to be coupled by a drive-establishing mechanism operative for connecting said shafts, a clutch arranged to establish direct drive between said shafts, actuators for said drive-establishing mechanism operative to couple said shafts thru said train or to connect said shafts through said clutch fluid pressure operated members for said actuators, fluid pressure supply means consisting of pumps effective to provide actuation pressure for said members during rotation of either or both of said shafts, manually operable valving for directing fluid pressure to said members for selective drive by said unit of said output shaft from said input shaft, a pressure-regulating valve actuable to provide a plurality of pressures to said valving and to said members, said valve being responsive to the pressure delivered for establishing at least one operative range of actuator pressures, and a modulating mechanism operative in accordance with the dynamometric measuring action of said device for varying the action of said pressure-regulating valve, said modulating mechanism being effective to cause said valve to provide a higher member actuator pressure under increased engine power and load as measured by said device, and to provide a decreased member actuator pressure under diminished engine power and load as measured by said device.

7. In a control system for a change-speed gear assembly having input and output members and a plurality of engageable and releasable friction elements actuable selectively for establishing different drive ratios between said members, a fluid pressure system for actuating said elements consisting of actuators for said elements, pumps constantly operative with rotation of one of said members to provide pressure to said actuators, pressure regulating valving for said pump pressure, operative to provide a variable line pressure, and pressure delivery valving adapted to distribute the pressure provided by said pumps for causing operation of said actuators; pressure feed passages connecting said regulating valving with said pressure delivery valving, pressure relief connections for said regulating and said delivery valving, an automatically operable valve of said first-named actuating valving effective to respond to the pressure delivered to said second-named delivery valving, a manually operable valve of said second-named valving shiftable to select distribution of the pressure delivered by said first-named valve to one of said actuators, a pressure space connected to said actuator in which the delivered actuator pressure appears, and a pressure-responsive connection to said first-named valve from said space operative to vary the regulating action of said automatically operable valve in accordance with the manual positioning of said manually operable valve.

8. In fluid pressure operated power transmission devices, a fluid supply source and including a fluid supply space, a valve body having a feed port connected to said supply space, an exhaust port, and a clutch delivery port, a control valve movable in said body to connect said feed port to the clutch delivery port or to connect the latter to said exhaust port, a fluid pressure actuated clutch consisting of driving and driven members each having mating friction plates for drive-transmission between the members, an enclosing drum rotating with one of the members, a fluid pressure actuator cylinder formed in the drum for continuing an actuating oil body derived from said supply space, a piston in the cylinder adapted to move so as to compress the said plates for driving engagement, a clutch unloading spring operative to release the drive of the said plates when the cylinder is not supplied fluid pressure to so move the piston, a pressure passage adapted to connect the said delivery port to the said cylinder for establishing the drive of said plates, a pressure-responsive relief valve operable to connect the interior of said cylinder to exhaust and equipped with valve-closing means normally operable to close the relief valve, and a mechanical connection between the said piston and said relief valve operative to open the said relief valve when the said control valve is moved to connect the said delivery port to said exhaust port.

9. In the construction set forth in claim 8, the sub-combination of said relief valve being located toward the outer periphery of said drum, said valve-closing means consisting of a element operable to yield to the force of the said clutch unloading spring exerted on said clutch cylinder oil body and likewise operable to yield to the centrifugal force of that oil body for providing relief outflow of said oil body when the said control valve is moved to connect the said delivery port to said exhaust port.

10. In the construction set forth in claim 8, the sub-combination of a flow controlling orifice located in the said pressure passage, said orifice restricting the relief of said cylinder by a predetermined amount such that the fluid pressure in the cylinder, during the interval when the control valve is moved to connect the said delivery port to exhaust is effective to apply a pressure tending to open the said relief valve.

11. In the construction described and set forth in claim 8, the sub-combination of an engine, a dynamometric device adapted to measure the power and load conditions of said engine, and having an element of said device movable proportionally to said power and load conditions and connected to vary the automatic pressure-determining action of said first-named pressure-responsive valve in accordance with said engine conditions.

12. In the construction described and set forth in claim 8, the sub-combination of an engine, an intake space in said engine in which variable, sub-atmospheric pressure is generated by changes in the power and load conditions of said engine, a vacuum-responsive device connected to said space and an element of said device responding to said variable pressure of said intake space operative to variably affect the automatic pressure-determining action of said first-named pressure-responsive valve.

13. In change-speed gearing controls embodying a plurality of drive trains adapted to connect power and load shafts, one of which trains includes a low speed range torque coupling mechanism and another of which trains includes a direct torque coupling mechanism, fluid pressure pumping means having a regulated pressure space, a fluid pressure actuator for each of said mechanisms, the actuator for said low range mechanism having a pressure-actuation and a pressure-release space, a manually operable valve movable to different positions for selecting the actuation of said actuators by delivering the pressure from said regulated pressure space in a sequential pattern of valve motion, said valve having one position in which it delivers said regulated pressure to said low range actuator space and having a second position in which it connects the said regulated pressure to said low range actuator space and to said direct clutch actuator at the same time, a pressure feed passage connected to the release space of said low range actuator and to the said clutch actuator space and arranged to receive regulated pressure when the said clutch actuator space is subjected to the pressure delivered by the said manual valve in its stated second position, and a pressure relief port for said manual valve which is connected to the said clutch actuator space when the valve is moved to said first position, the arrangement therefor providing a timed coordinated actuation of said low range mechanism with release of said direct coupling mechanism.

14. In a variable speed ratio drive assembly, an engine, input and output shafts, including a gear mechanism adapted to connect said shafts embodying a plurality of drive trains one of which provides drive in low range ratio and another of which provides drive directly between the shafts, a reaction element for said first train, a brake adapted to stop the rotation of said reaction element and thereby establish low range drive of said output shaft by said first drive train, a clutch for said second train, a fluid pressure actuator for said brake including an actuation space and a release space, a releasing spring for said brake, a fluid pressure actuator for said clutch having an actuation space, a release spring for said clutch, a variable pressure supply space, a valve movable to different positions operative for connecting the pressure of said supply space to the said brake actuation space in one of said positions and operative to connect the pressure of said supply space to the said brake actuation space and to the said clutch actuation space in another of said positions, and fluid pressure connections between the said clutch actuation space and the said brake release space operative when the valve is in the said second position to provide equalizing pressure to balance out the said pressure of said brake actuation space for permitting said brake release spring to hold the said brake disengaged.

15. In the combination set forth in claim 14, the sub-combination of a pressure relief connection for the said clutch actuator space, a relief valve exposed to the pressure of the clutch actuator space, a loading means for said valve normally operative to hold the said relief valve closed when said clutch actuator space is under pressure delivered by said movable valve, and valve operating mechanism energised by the said clutch relief spring effective to open said relief valve when the said movable valve is in the said first position.

16. In the combination set forth in claim 14, the subcombination of a regulating orifice in the connection of said clutch actuator space with the said supply space thru the said movable valve, a relief port for the said connection for draining the said clutch actuator space when the said movable valve is in its first stated position, and said orifice being effective to control the rate of relief of said clutch actuator space pressure and of the said pressure of said brake release space upon movement of said movable valve from the second stated to the first stated position.

17. In power transmission assemblies, an engine shaft, an intermediate shaft driving a transmission unit, an output member driven by said transmission unit, change-speed actuator mechanism operative to change the drive ratio of said unit, variably operable devices for controlling the action of said mechanism, a fluid torque converter adapted to couple said shafts at variable torques and including bladed rotor elements arranged to generate circulatory flow of an oil body in a fluid working space in which the bladed portions of said rotor elements rotate, a fluid pressure supply source for said oil body, a passage connecting same to said working space thru a first orifice, a draining connection leading away from the said working space and connected to a second orifice, the said passage and said connection constituting portions of a circulation flow of said oil body thru said working space, and pressure-responsive means effective to vary the operation of said devices upon said mechanism and made operative for such variation action by responding to pressures provided in said passage and said connection, for regulating the degree of actuation of said mechanism.

18. In power transmission control devices, a variable power engine, a vacuum manifold for said engine having vacuum pressure varying with the power and load of said engine, pumping means operable to maintain fluid pressure in a pressure space, a shiftable regulator valve connected to the said pressure space and operable to provide a varying pressure in a regulated pressure space, a power transmission assembly driven by said engine and adapted to be controlled and actuated by fluid pressure derived from said regulated pressure space, said assembly embodying a fluid pressure working space, a modulator mechanism consisting of a container providing a plurality of compartments with pressure-responsive diaphragms located in the said compartments, one diaphragm being subject to the varying vacuum force of the said manifold acting against a diaphragm spring placed to oppose the said vacuum pressure, a second diaphragm of which is subjected to opposing forces derived from said differential pressure zones of said working space, a thrust-transmitting element connecting the first diaphragm with the said diaphragm, a thrust-transmitting element connecting the said second diaphragm to the said regulator valve so as to apply thereto a varying force operable to influence the variation of pressure provided to said regulated pressure space, and operator-operable means to vary the power of said engine and thereby require said modulator mechanism to act variably against said first diaphragm and said diaphragm spring to influence the action of said regulator valve by force transmitted thereto by said elements.

19. In flow controlling systems for fluid pressure operated transmission assemblies, a fluid torque converter for transmitting torque between power-and-load connected members and having bladed rotors with the blades thereof located in a fluid working space, a pump having a pump delivery pressure space, a working space flow circulation system connected to said working space by an inflow passage connected to said pump pressure space thru a restricted inlet orifice of given dimension and by an outflow passage connected to a drain passage thru a restricted outlet orifice likewise of predetermined dimension, said restricted orifices being operative to create and maintain a predetermined dynamic pressure head in said working space and a check valve exposed to the differential pressures of said inflow and outflow passages and operable to relieve any outflow pressure greater than inflow pressure to the said inflow passage.

20. In the combination set forth in claim 19, the subcombination of a change-speed transmission driven by said output member and driving an output shaft, a fluid pressure actuated clutch in said transmission, fluid pressure actuator mechanism adapted to engage and hold said clutch engaged or to release the clutch, variable pressure control connections from said inflow and outflow passages leading to a modulator mechanism, said mechanism being perative to respond to the variable pressure of said connections and apply a variable regulation of the actuation provided by said modulator mechanism to said clutch for graduating the loading of the clutch in accordance with the variations of the said converter inflow and outflow pressures.

21. In power transmissions controlled and actuated by fluid pressure, a power transmission assembly for connecting power and load members at varying speed ratio ranges, said assembly embodying a plurality of friction, torque-establishing elements adapted to be variably loaded by fluid pressure for providing such established torque at different torque capacities of said elements, a single fluid pressure pumping and supply system for furnishing actuation force for said elements, said system including pumps driven by rotation of said members, and a check valve subject to the presence or absence of pressure supplied by one or the other of said pumps for maintaining a supply of pressure to said regulator valve whenever either of said members is rotating, a regulated pressure space connected to provide variable loading of said elements, and a regulator valve adapted to respond to predetermined pressures supplied by said pumps and operative to establish a range of actuating pressures in said regulated pressure space effective to provide said different torque capacities of said elements.

22. In the combination set forth in claim 21, the subcombination of a reaction pressure passage connecting the pressures of said regulated pressure space to cause said regulator valve to establish a normal equilibrium range of regulated pressures in the said space.

23. In the combination set forth in claim 21, the subcombination of a control valve movable to different positions and connected to deliver the pressure of said regulated pressure space thereby selectively to said elements, a pressure modulator device conected to said valve and to the said regulator valve for requiring said regulator valve to provide a higher pressure to said regulated pressure space for one selected position of the control valve as against its setting in another selected position.

24. In a fluid pressure actuated power transmission mechanism, a fluid pressure supply for providing actuation of power transmitting elements of said transmission mechanism, a valve body, a ported valve bore in said body, a movable pressure regulating valve in said bore, a valve spring adapted to apply a loading force to said valve, a pressure inlet port for said bore connected to said supply, a pressure outlet port for said bore, a pressure relief port therefor, a boss of said valve effective to move with said valve and close the aperture of said relief port in varying spacing and thereby vary the effective regulated pressure in said outlet port, a reactive pressure passage connected to said outlet port and arranged to provide a pressure tending to move the valve against the force of said spring, and a pressure modulation device for applying a variable load acting against said reactive pressure for changing the aperture of said relief port in accordance with a predetermined modulation force provided by said device, such that variable actuation of said elements is obtained thereby.

25. In the combination set forth in claim 24, the subcombination of an actuator control valve arranged to direct the pressure of said pressure outlet port selectively to said elements, a pressure delivery passage leading to one of said elements, and a pressure-responsive connection from that passage to the said regulating valve operative to augment the action of said reactive pressure and thereby reduce the effective regulated pressure of said outlet port during the interval when said control valve is delivering pressure to the stated selected element.

26. In the combination set forth in claim 24, the subcombination of an engine for driving said mechanism having a vacuum space in which a variable vacuum pressure is generated by variations in the power and load of the engine, and a vacuum responsive device subjected to said varying vacuum pressure and having an operated element connected to the said modulation device for transmitting thereto a modulating force varying with the said generated vacuum pressure.

27. In the combination set forth in claim 24, the subcombination of an engine connected to drive a fluid torque converter adapted to drive said transmission mechanism, said torque converter consisting of a plurality of bladed members rotating within a fluid working space and generating a circulatory flow of fluid in said working space, connecting passages arranged to circulate an oil body to and from said working space, and pressure connections between said modulation device and said circulating passages effective to create a modulating force on said modulation device in accordance with differential pressures existing in said connecting passages.

28. In actuation and control systems for variable speed transmissions, the combination of an engine, of power and load shafts, and a transmission assembly adapted to couple said shafts at predetermined torques and speeds, said transmission assembly including a fluid turbine drive unit operative to transmit a range of variable torques and including a second unit driven by said first-named unit adapted to provide a plurality of step-ratio drives to said load shaft, drive-sustaining members of said second unit selectively actuable for establishing said step-ratio drives, actuating mechanism for said members operative with variable degrees of loading force thereupon and a force-modulation control device made operative by the degree of fluid pressure existing in said first-named unit and effective to control the actuating force applied to said members by said mechanism, the useful result of the stated action of said device being to obtain optimum torque capacities of said members for different operating conditions of said engine and said load shaft.

29. In the combination set forth in claim 28, the subcombination of drive-selecting control apparatus operative to select the action of said actuating mechanism upon said drive-sustaining members for establishing the step-ratio drives delivered to said load shaft, and control linkage of said apparatus effective to apply a selective regulatory force to the said device in accordance with the selective setting of said apparatus.

30. In a variable ratio transmission assembly having alternately actuated fluid pressure operated friction members wherein a first of said members has both a pressure fed actuator and a release space, and a second of said members acting as a clutch has a pressure actuator space, a fluid supply system providing variable pressure for said spaces from a supply space, a movable valve adapted to deliver pressure from said supply space to said first member and said clutch actuator spaces, said valve having a first and a second position, a connection between said valve and said clutch actuator space including a regulating orifice operative to limit the rate of flow through the said connection, and a relief port for the said connection effective to drain said clutch actuator space when said valve is in its first stated position, the arrangement of the said orifice being operative to control the rate of pressure relief of said clutch actuator space and of the said pressure of said brake release space when the said valve is moved from its second to its first stated position.

31. In power transmissions having plural friction torque establishing elements actuated by fluid pressure actuators supplied by pumps driven from power input and output transmission shafts wherein the said elements provide variable speed ratios of drive; a pressure regulator valve subject to pump pressure and having a regulated pressure space, a control valve for delivering pressure from said space to said element actuators selectively, and a pressure modulator device connected to said control valve and connected to the said regulator valve through a resilient linkage operative to cause said regulator valve to provide a higher pressure to said space for one selected position of the control valve as against the setting in another selected position, wherein the pressure thus selected for delivery to one of said elements applies a higher torque-determining force to said element than is applied when said control valve is set in said other selected position.

32. In the combination set forth in claim 13, the subcombination of porting connected with said pressure feed passage connected to the release space of said low-range actuator and connected to the said clutch actuator space, and arrangement of said porting and passage being effective, when the valve is moved to the said second position to feed pressure to said direct coupling mechanism, and provide a timed, coordinated actuation of said direct coupling mechanism during an interval when the pressure is being released from said low range mechanism.

33. In fluid-actuated clutch and transmission mechanisms, a first member mounted for rotation, a second member associated with said first member and adapted to rotate therewith, said members defining a fluid pressure chamber therebetween, said second member being movable longitudinally of said first member in response to fluid pressure actuation, a normally open vent port in said first member communicating with said pressure chamber, and a valve member mounted in said first member adjacent the periphery thereof for movement in a path parallel to the axis of rotation of said first member, said valve member being associated with said vent port to control flow therethrough, said valve member being operatively associated with said second member to move with said second member with respect to said first member and said vent port; said valve member including a vent port closing portion normally disposed in an open position relative to said vent port, said valve member being movable with said second member to close said vent port only after a predetermined magnitude of movement of said second member upon fluid pressure actuation of said second member.

34. In fluid-actuated clutch and transmission mechanisms, a first member mounted for rotation, a second member associated with said first member and adapted to rotate therewith, said members defining a fluid pressure chamber therebetween, one of said members being movable longitudinally relative to the other member in response to fluid pressure actuation, a normally open vent port in said first member communicating with said pressure chamber, and a valve member mounted in said first member adjacent the periphery thereof for movement relative to said first member in a path parallel to the axis of rotation of said first member, said valve member being associated with said vent port to control flow therethrough, said valve member being operatively associated with said second member to move with said second member relative to said first member and said vent port, said valve member including a vent port closing portion normally disposed in an open position relative to said vent port, said valve member being movable with said second member to close said vent port only after a predetermined magnitude of relative movement of said one of said members upon fluid pressure actuation of said one of said members.

35. A power transmission including in combination, a hydrodynamic torque converter adapted to deliver power from a prime mover to an output shaft at varying torque ratios, the torque converter including an impeller driven by the prime mover and a turbine defining a space for circulating liquid, a friction drive-establishing device for connecting the turbine to said output shaft, means for circulating liquid under pressure into and out of the torque converter space, fluid pressure operated means for actuating said friction device, the transmission including a source of fluid under pressure for said fluid pressure operated means, and means responsive to the difference in pressure of liquid entering the torque converter space and liquid leaving the torque converter space for varying the pressure of said source.

36. A power transmission including in combination, a hydrodynamic torque converter adapted to deliver power from a prime mover to an output shaft at varying torque ratios, the torque converter including an impeller driven by the prime mover and a turbine defining a space for circulating liquid, a friction drive-establishing device for connecting the turbine to said output shaft, a source of liquid under pressure, supply and return conduits for circulating liquid from said source into and out of the torque converter space, means responsive to the pressure of liquid from said source for maintaining a regulated pressure, fluid pressure operated means for actuating the friction device, and means responsive to the difference in pressure of liquid entering and leaving the torque converter space for changing the response of the pressure-responsive regulating means.

37. A power transmission including in combination, a hydrodynamic torque converter adapted to deliver power from a prime mover to an output shaft at varying torque ratios, the torque converter including an impeller driven by the prime mover and a turbine defining a space for circulating liquid, a friction drive-establishing device for connecting the turbine to said output shaft, a source of liquid under pressure, supply and return conduits for circulating liquid from said source into and out of the torque converter space, means responsive to the pressure of liquid from said source for maintaining a regulated pressure, fluid pressure operated means for actuating the friction device, an expansible chamber connected to the supply conduit for increasing the pressure maintained by the regulating means, and a second expansible chamber connected to the return conduit for decreasing the pressure maintained by the regulating means.

38. A power transmission including in combination a hydrodynamic torque converter adapted to deliver power from a prime mover to an output shaft at varying torque ratios, the torque converter including an impeller driven by the prime mover and a turbine defining a space for circulating liquid, a plurality of friction-establishing devices for connecting the turbine to the output shaft at different ratios, a fluid pressure operated means for actuating each friction device, a source of liquid under pressure, regulating means responsive to the pressure of the source for maintaining a regulated pressure, a selector valve for selectively directing liquid from the regulating means to the actuating means, supply and return conduits for circulating liquid from the source to and from the converter space, a pressure responsive expansible chamber for decreasing the pressure maintained by the regulating means, a second pressure responsive expansible chamber for increasing the pressure maintained by the regulating means, connections for said chambers to the supply and return conduits, and means responsive to the position of the selector means for selecting the connections of the supply and return conduits to said chambers.

References Cited in the file of this patent
UNITED STATES PATENTS

| | | |
|---|---|---|
| 2,576,336 | Farkas | Nov. 27, 1951 |
| 2,595,969 | McFarland | May 6, 1952 |
| 2,609,706 | Jandasek | Sept. 9, 1952 |
| 2,651,918 | Kelley et al. | Sept. 15, 1953 |

UNITED STATES PATENT OFFICE
CERTIFICATE OF CORRECTION

Patent No. 2,821,095

January 28, 1958

Oliver K. Kelley

It is hereby certified that error appears in the printed specification of the above numbered patent requiring correction and that the said Letters Patent should read as corrected below.

Column 5, line 35, for "rotor I" read -- rotor O --; column 7, line 31, for "38" read -- 28 --; column 10, line 3, for "leading" read -- loading --; column 19, lines 36 through 40, strike out the present printed paragraph and insert instead:

> In Fig. 15 the valve body 266 is bored at 126, and the valve 130' is provided with bosses f, g, h and i, as shown, comparable with similar bosses of valve 130 of Fig. 6.

Column 19, line 46, for "passage" read -- passing --; line 48, for the numeral "185" read -- 85 --; column 24, line 34, for "regulation" read -- regulating --; column 25, line 35, for "continuing" read -- containing --; column 28, line 11, for "perative" read -- operative --.

Signed and sealed this 22nd day of April 1958.

(SEAL)

Attest:

KARL H. AXLINE

Attesting Officer

ROBERT C. WATSON

Commissioner of Patents